(12) United States Patent
Baxter

(10) Patent No.: US 10,724,793 B2
(45) Date of Patent: Jul. 28, 2020

(54) SYSTEMS AND METHODS FOR SEPARATING CONDENSABLE VAPORS FROM LIGHT GASES OR LIQUIDS BY RECUPERATIVE CRYOGENIC PROCESSES

(75) Inventor: Larry L. Baxter, Provo, UT (US)

(73) Assignee: Hall Labs LLC, Provo, UT (US)

( * ) Notice: Subject to any disclaimer, the term of this patent is extended or adjusted under 35 U.S.C. 154(b) by 921 days.

(21) Appl. No.: 13/482,980

(22) Filed: May 29, 2012

(65) Prior Publication Data

US 2012/0297821 A1   Nov. 29, 2012

Related U.S. Application Data

(63) Continuation of application No. PCT/US2012/039775, filed on May 26, 2012.
(Continued)

(51) Int. Cl.
    *F25J 3/06* (2006.01)
    *B01D 53/34* (2006.01)
    *B01D 53/00* (2006.01)

(52) U.S. Cl.
    CPC .......... *F25J 3/067* (2013.01); *B01D 53/002* (2013.01); *B01D 53/343* (2013.01);
    (Continued)

(58) Field of Classification Search
    CPC .......... F25J 1/0027; F25J 1/005; F25J 1/0052; F25J 1/0055; F25J 1/0204; F25J 1/0205;
    (Continued)

(56) References Cited

U.S. PATENT DOCUMENTS 3,203,192 A  *  8/1965  Hashemi .................. C07C 7/14
                                                    62/638
3,400,512 A     9/1968  McKay
                   (Continued)

FOREIGN PATENT DOCUMENTS

CN     1126630      7/1996
CN     1476346      2/2004
            (Continued)

OTHER PUBLICATIONS

Baxter et al. Cryogenic CO2 Capture to Control Climate Change Emissions. Web Document <web.archive.org/web/20150824182902/sustainablees.com/documents/cccpittsburghcoalconference.pdf>, 13 pages, Oct. 4, 2009, Retrieved from <web.archive.org/web/20091004052208/www.sustainablees.com/index-3.html> on Aug. 18, 2015.*

(Continued)

*Primary Examiner* — Brian M King

(57) ABSTRACT

Methods and systems of the current invention separate condensable vapors such as carbon dioxide from light gases or liquids in a mixed process stream. The separation is carried out in a cryogenic process using one or more external cooling loops (ECLs) that first cool down a mixed process stream containing condensable vapors and light gases or liquids, causing the condensable vapors to desublimate and form solids. Next, the solids are separated from the light gases or liquids, forming a solid stream and a light gas or liquid stream. Then the refrigerants of the ECL are cooled by warming the separated solid stream and light gas or liquid stream, efficiently recovering energy used in cooling and desublimating the condensable vapors.

5 Claims, 7 Drawing Sheets

Related U.S. Application Data

(60) Provisional application No. 61/519,667, filed on May 26, 2012.

(52) U.S. Cl.
CPC .... *B01D 2256/10* (2013.01); *B01D 2257/504* (2013.01); *F25J 2205/20* (2013.01); *F25J 2210/70* (2013.01); *F25J 2215/04* (2013.01); *F25J 2220/82* (2013.01); *F25J 2220/84* (2013.01); *F25J 2235/80* (2013.01); *F25J 2270/12* (2013.01); *F25J 2270/42* (2013.01); *F25J 2270/58* (2013.01); *F25J 2270/60* (2013.01); *Y02C 10/12* (2013.01)

(58) Field of Classification Search
CPC ........ F25J 1/0207; F25J 3/067; F25J 2205/02; F25J 2205/20; F25J 2210/70; F25J 2210/80; F25J 2215/80; F25J 2230/80; F25J 2270/14; F25J 2270/80; B01D 53/002
USPC .......................................... 62/601, 602, 617
See application file for complete search history.

(56) References Cited

U.S. PATENT DOCUMENTS

| | | | |
|---|---|---|---|
| 4,528,002 | A | 7/1985 | Linde |
| 4,702,818 | A | 10/1987 | Oyamoto et al. |
| 4,769,054 | A | 9/1988 | Steigman |
| 5,956,971 | A | 9/1999 | Cole et al. |
| 6,038,877 | A * | 3/2000 | Peiffer ............... B60H 1/00007 62/244 |
| 6,383,257 | B1 | 5/2002 | McDermott et al. |
| 6,591,632 | B1 * | 7/2003 | Mahoney ................ F25B 9/006 62/434 |
| 8,715,401 | B2 | 5/2014 | Baxter |
| 8,764,885 | B2 | 7/2014 | Baxter et al. |
| 2002/0153514 | A1 | 10/2002 | Wixey |
| 2002/0189443 | A1 | 12/2002 | McGuire |
| 2004/0148961 | A1 | 8/2004 | Clodic |
| 2005/0072186 | A1 * | 4/2005 | Amin ....................... F25J 3/061 62/601 |
| 2006/0277942 | A1 * | 12/2006 | Clodic ................. B01D 53/002 62/532 |
| 2007/0114488 | A1 | 5/2007 | Jackson |
| 2007/0277674 | A1 | 12/2007 | Hirano |
| 2008/0188819 | A1 | 8/2008 | Kloke et al. |
| 2008/0193351 | A9 * | 8/2008 | Boardman et al. ........... 423/210 |
| 2008/0302133 | A1 * | 12/2008 | Saysset ..................... C10L 3/10 62/617 |
| 2009/0173073 | A1 * | 7/2009 | Guidati et al. .................. 60/670 |
| 2010/0162752 | A1 | 7/2010 | Tabata et al. |
| 2010/0287123 | A1 * | 11/2010 | Verma ..................... F17D 1/005 705/500 |
| 2011/0252827 | A1 * | 10/2011 | Lockwood ........... B01D 53/002 62/602 |
| 2012/0017638 | A1 * | 1/2012 | Prast ....................... B01D 45/16 62/602 |
| 2012/0132072 | A1 | 5/2012 | Baxter |
| 2012/0180657 | A1 * | 7/2012 | Monereau ............ B01D 53/002 95/45 |

FOREIGN PATENT DOCUMENTS

| | | |
|---|---|---|
| FR | 2940414 | 12/2008 |
| FR | 2940412 A1 * | 6/2010 |
| FR | 2940413 A1 * | 6/2010 |
| WO | WO2008004321 | 1/2008 |
| WO | WO 2009070785 A2 * | 6/2009 |
| WO | WO2010045705 | 4/2010 |
| WO | WO2011097043 | 8/2011 |

OTHER PUBLICATIONS

Translation of FR 2940413 A1.*
U.S. Appl. No. 14/204,882, filed Mar. 11, 2014, Baxter, Larry L.
Chinese Office Action for Chinese Patent Application No. 201080021604.4, dated Jul. 25, 2013, 10 pages.
International Search Report for PCT Patent Application No. PCT/US2011/061737, dated Feb. 14, 2012.
U.S. Appl. No. 13/257,261, filed Oct. 15, 2013, Restriction Requirement.
U.S. Appl. No. 13/257,261, filed Dec. 16, 2013, Office Action.
U.S. Appl. No. 13/257,261, filed Feb. 6, 2014, Notice of Allowance.
U.S. Appl. No. 13/301,731, filed Jan. 16, 2014, Office Action.
U.S. Appl. No. 13/301,731, filed Mar. 3, 2014, Notice of Allowance.

* cited by examiner

SYSTEMS AND METHODS FOR SEPARATING CONDENSABLE VAPORS FROM LIGHT GASES OR LIQUIDS BY RECUPERATIVE CRYOGENIC PROCESSES

CROSS REFERENCE TO RELATED APPLICATIONS

The present application is a continuation of International PCT Application PCT/US12/39775 filed May 26, 2012, titled "Systems and Methods for Separating Condensable Vapors from Light Gases or Liquids by Recuperative Cryogenic Processes," and also claims the benefit of Untied States Provisional Patent Application Ser. No. 61/519,667, filed May 26, 2011, titled "Cryogenic Carbon Capture Process," which are hereby incorporated herein by reference.

BACKGROUND

1. The Field of the Invention

The present invention relates to cryogenic systems and methods for separating condensable vapors (e.g., carbon dioxide) from light gases or liquids (e.g., nitrogen gas) by cooling the condensable vapors with one or more external cooling loops to cause the vapors to desublimate.

2. The Related Technology

The separation of carbon dioxide from other light gases or liquids such as nitrogen or methane is important for achieving carbon dioxide sequestration. Process gas from a conventional power station typically includes from about 4% (vol.) to about 16% (vol.) carbon dioxide ($CO_2$) and raw natural gas from a well can include large amounts of $CO_2$. This process technology addresses both these and similar processes containing a condensable, desublimating vapor. It is commonly believed that this $CO_2$ represents a significant factor in increasing the greenhouse effect and global warming. Therefore, there is a clear need for efficient methods of capturing $CO_2$ from process gases to produce a concentrated stream of $CO_2$ that can readily be transported to a safe storage site or to a further application. Additionally, $CO_2$ in natural gas represents an inert component that is expensive to transport and dilutes the effectiveness of the natural gas. These and similar streams containing a desublimating vapor are addressed by these methods and processes. $CO_2$ has been captured from gas streams by several technologies, the most common of which include: oxyfiring, where oxygen is separated from air prior to combustion, producing a substantially pure $CO_2$ effluent; absorption, where $CO_2$ is selectively absorbed into liquid solvents; membranes, where $CO_2$ is separated by semi-permeable plastics or ceramic membranes; adsorption, where $CO_2$ is separated by adsorption on the surfaces of specially designed solid particles; chemical looping, where carbon oxidation and oxygen consumption are physically separated by a recycled intermediate, typically metal oxide; and low temperature/high pressure processes, where the separation is achieved by condensing the $CO_2$.

In the past, the most economical technique to capture $CO_2$ from a process gas has been to scrub the process gas with an amine solution to absorb the $CO_2$. This technology has been used commercially for small-scale processes and for specialty processes. For instance, Flour developed a process, called Econamine FG+, for doing so. However, it has not been demonstrated in utility-scale power plants. In all cases, the projected reduction in process efficiency and increase in process costs are high (25-30% and 80%, respectively, according to DOE estimates for power stations).

Another type of process is the oxy-combustion system, which uses oxygen, usually produced in an air separation unit (ASU), instead of air, for the combustion of the primary fuel. The oxygen is often mixed with an inert gas, such as recirculated process gas, to keep the combustion temperature at a suitable level. Oxy-combustion processes produce process gas having $CO_2$, water and $O_2$ as its main constituents; the $CO_2$ concentration being typically greater than about 70% by volume. Treatment of the process gas is often needed to remove air pollutants and non-condensed gases (such as nitrogen) from the process gas before the $CO_2$ is sent to storage.

Cryogenic processes are emerging new methods for separating $CO_2$ from other gases by condensing $CO_2$. Conventional refrigeration processes are not energy efficient because the processed gases are cooled to a very low temperature, consuming substantial amount of energy in cooling and compressing. Pressurizing $CO_2$ in the process stream and cooling the incoming gases with the outgoing cold products through thermal integration reduces the energy needed to cool and condense $CO_2$, but compressing $CO_2$ and impurities in process gas lead to acidic streams that pose challenges to equipment in high-pressure systems. In addition, expanding a process gas stream containing a desublimating component may damage turbomachinery. For instance, expanding compressed $CO_2$ leads to solid formation in expansion devices or turbines, which could damage the machine or imbalance the prime mover. Compressing sour gases also condenses moisture, commonly with acidic compounds and particulate included. All of these issues can be overcome in compression-based processes, but there remains interest in processes that avoid process gas compression but still achieve efficient $CO_2$ removal via cryogenic processing.

BRIEF SUMMARY

The present disclosure describes systems and methods for separating condensable vapors (e.g., carbon dioxide) from other gases (e.g., nitrogen) in a continuous separation process. The separation occurs in a cryogenic process using one or more external cooling loops (ECLs) that first cool down a mixed process stream containing condensable vapors and light gases or liquids, causing the condensable vapors to desublimate and form solids. Next, the solids are separated from the light gases or liquids, forming a solid stream and a light gas or liquid stream. Then the refrigerants of the ECL cool by warming the separated solid stream and light gas or liquid stream, efficiently recovering energy used in cooling and desublimating the condensable vapors. Finally the condensed vapors are processed and prepared for transport and ultimate sequestration as the liquid stream warms to a near-ambient temperature. Although the mixed process stream may be compressed in the method, it is not necessary to do so, which affords flexibility of refrigerant choice and eliminating problems associated with compressed acidic process streams and solids formation in expansion devices in a high pressure systems.

The invention fundamentally differs from conventional cryogenic processes in that instead of only cooling the process stream as in conventional methods, the methods of the invention first cool a process stream, then rewarm it to its original temperature, cooling the refrigerants and recuperating the cooling energy. Furthermore, in some embodiments the methods of the invention stage the cooling and warming of the refrigerants such that the refrigerants of the ECLs and process stream components match in their temperature profiles, in that the temperature differences between the cooler streams and the warmer streams are relatively small and constant, and that the phase changes of the cooler streams are within degrees below the phase changes of the warmer streams. These characteristics of the system maximize the efficiency of heat exchange, leading to system efficiencies that greatly exceed conventional methods.

As a result, implementations of the invention enjoy all or a portion of the following advantages over conventional separation methods. The systems (1) minimize energy consumption compared to currently contemplated air-separation-unit-based systems (oxyfuel and gasification) and solvent-based systems (traditional absorption) by recovering heating/cooling energy in heat exchangers operating on the input and product streams and by avoiding cyclic process elements that experience temperature changes but are not discharged from the process, leading to energy consumption via entropy generation; (2) minimize energy consumption associated with pressurizing the $CO_2$ by providing the $CO_2$ in condensed form and hence greatly reducing pressurization energy requirements; (3) operate continuously without significant compression, expansion, or other pressure-changing actions on the process gas or process fluid except to provide relatively small pressure increases to maintain flows; (4) allow the primary cooling load to occur in a dedicated, sealed refrigeration circuit that can be separately operated and maintained; (5) provide constant removal of condensate as a condensed phase, avoiding handling and pressurization complexities associated with gas compression; (6) minimize expense by providing a minimally invasive, bolt-on option for removing light gases or liquids, by increasing the minimum temperature that must be achieved relative to air-separation-unit-based systems, and by operating at warmer conditions with broader materials availabilities compared to air-separation-unit-based systems; (7) maximize product purity by forming a solid product phase that is nominally pure; (8) minimize water demand by recovering large fractions of the water in the process gas in a usable form, by decreasing energy consumption and waste heat generation, and by producing a cool light gas or liquid stream useful for cooling other plant processes.

One aspect of the invention relates to methods for separating condensable vapors (e.g., $CO_2$) from light gases or liquids (e.g., $NO_2$). An embodiment of the invention includes all or a portion of the following steps: (i) providing a mixed process stream comprising at least one condensable vapor and at least one light gas or liquid; (ii) cooling the mixed process stream to a temperature of $T_1$ to cause the condensable vapor to desublimate using one or more refrigerants; (iii) separating the desublimated condensable vapor from the light gas or liquid to form a solid stream and a light gas or liquid stream; (iv) pressurizing the solid stream; and (v) cooling the one or more refrigerants using at least a portion of the solid stream, thereby melting the solid stream to form a liquid stream.

An embodiment of the invention further improves energy efficiency by matching the temperature profiles between the condensable vapor and the refrigerant, such that the temperature difference between the two remains relatively small, preferably less than 20° C., more preferably less than 5° C., and more preferably still less than 1° C., and the phase changes of one approximate those of the other.

Another aspect of the invention relates to systems and apparatus for separating condensable vapors from light gases or liquids. One embodiment of the system comprises: (i) at least one external cooling loop (ECL) comprising (a) an expansion device, (b) a desublimating gas refrigerant heat exchanger (D-GHE) that causes the condensable vapor to desublimate, yielding a solid stream and a light gas or liquid stream, (c) a compressor, (d) a heat-rejection heat exchanger (HRHE) at or above room temperature or a temperature at which heat can be transferred to the local environment (such as to cooling water), (e) a recuperative melting heat exchanger (R-MHE) configured to cool the refrigerant by melting at least a portion of the solid stream to form a liquid stream, and (f) at least one refrigerant circulating in the at least one ECL; (ii) a solids separator within or downstream from the D-GHE configured to separate the solid stream from the light gas or liquid stream; (iii) a solids compressor downstream from the solids separator and upstream from the R-MHE configured to pressurize the solid stream.

In one embodiment of the invention, a refrigerant of the ECL is configured to evaporate under a lower pressure and at a temperature just below the lowest desublimating temperature of the condensable vapor, and condense under a higher pressure at a temperature just above the melting temperature of the solid stream. In an alternative embodiment of the invention, the ECL may include a mixture of a first and a second, or multiple, refrigerant, wherein the first refrigerant evaporates under a lower pressure at a temperature just below the lowest desublimating temperature of the condensable vapor, and the second refrigerant condenses under a higher pressure at a temperature just above the melting temperature of the solid stream.

In a preferred embodiment of the invention, the system comprises two or more ECLs, such as one outer ECL and one inner ECL. The outer ECL cools the mixed process stream to $T_2$, and then the inner ECL further cools the mixed process stream to $T_1$, a temperature lower than $T_2$, at which point the condensable vapor desublimate, yielding a solid stream and a light gas or liquid stream. The solid stream is separated from the light gas or liquid stream by a solids separator, and then compressed by a solids compressor. The cooled and separated solid stream and light gas or liquid stream are then used to cool or transfer heat from the refrigerants of the two ECLs using the melting solids stream, primarily for the inner ECL, and the pre-melting solids stream and the liquid stream, primarily for the outer ECL.

To maximize heat exchange efficiency, it is advantageous to match the temperature profiles of the cooler streams and the warmer streams in heat exchangers. This can be achieved by choosing and combining different refrigerants, staging multiple heat exchangers, controlling flow rates of the streams, adjusting pressures of the refrigerants, and similar process control and refrigeration operations common to the industry. In some embodiments, a relatively small temperature difference exists between the heat exchanging streams, preferably less than 20° C., more preferably less than 5° C., and most preferably less than 1° C. Energy efficiency can be further improved by bringing the phase change temperatures of the warmer stream and cooler stream into close proximity. For instance, a refrigerant of the inner ECL can be configured to evaporate under a lower pressure in a temperature range of 0-20° C. below the lowest desublimating temperature of the condensable vapor, while the same refrigerant is configured to condense under a higher pressure in a temperature range of 0-20° C. above the melting temperature of the condensable vapor.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

I. Introduction

Figure 1:
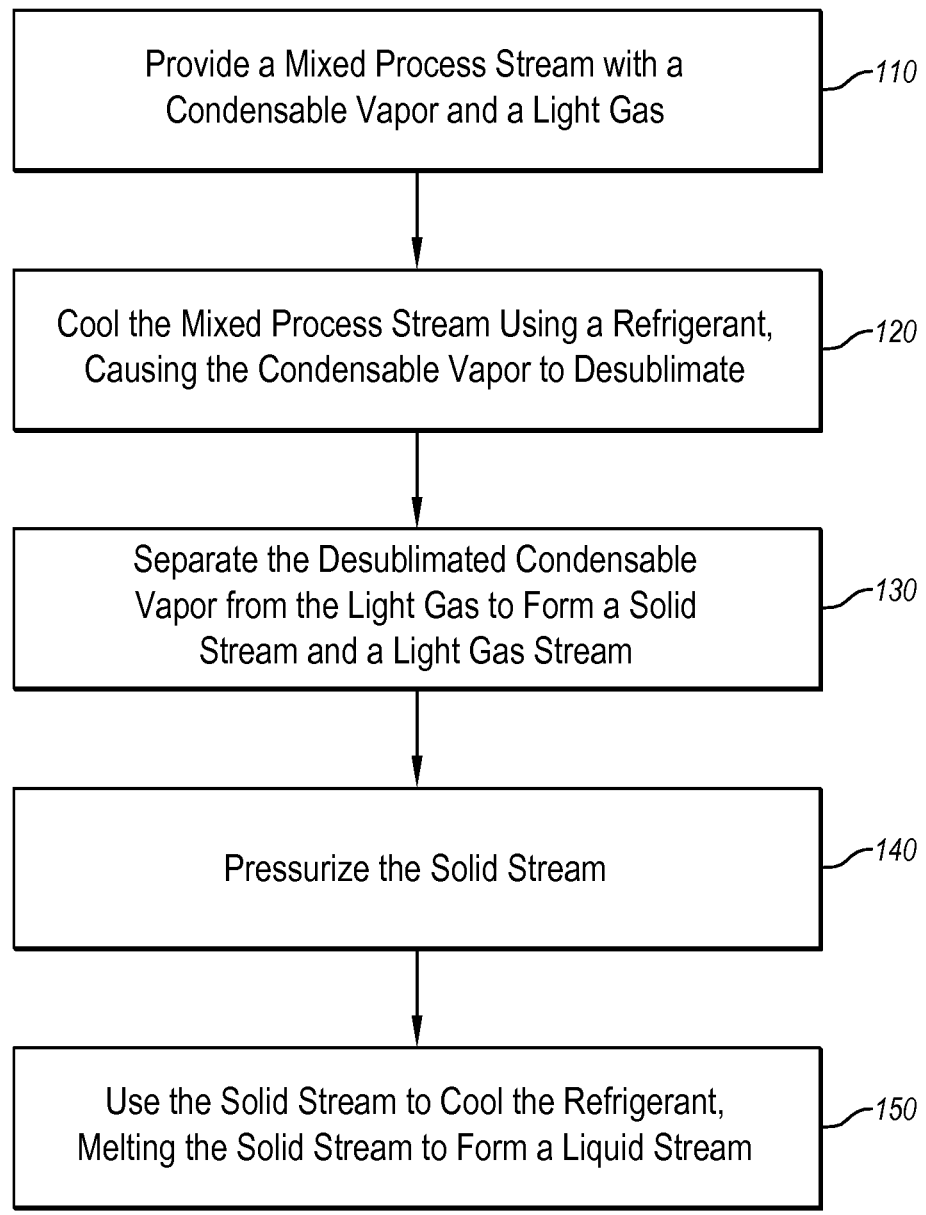
FIG. 1 is a block diagram illustrating the steps of a method for separating condensable vapors from gases according to one embodiment described herein.

The systems and methods disclosed herein relate to separating condensable vapors from a process stream (e.g., the process gas from a power plant) to form a solid and a separated light-gas stream. The process stream is typically produced in a hydrocarbon processing plant or sometimes in $CO_2$ sensitive air supplies for life support. Examples of hydrocarbon processing plants and breathing air supply systems that produce a stream suitable for use in the present invention include, but are not limited to coal fired power plants, natural gas fired power plants, fuel oil fired power plants, biomass fired power plants, petrochemical process streams, ambient air in confined or closed spaces such as submarines, natural gas purification streams, syngas or producer gas streams from gasifiers, exhaust from stationary and possibly mobile gasoline, diesel, or similar engines, and black-liquor combustion or gasification effluents.

While the present invention is particularly advantageous for use with process streams from power plants (flue gases), the invention can also be used with other industrial process streams, such as, but not limited to, process streams from petroleum refining, natural gas treatment, and biomass process streams. In the detailed description below, most examples of the process stream are given as process gas containing $CO_2$, $N_2$ and impurities, but the invention can be applied to other condensable vapors and light gases or liquids observing the same underlying principles.

The current invention can be applied to cryogenic carbon capturing (CCC) of process gas, which involves cooling and rewarming process gas to its original temperature. This differs fundamentally from typical refrigeration processes. Refrigeration most commonly involves cooling a stream for use in a subsequent process step without recovering energy. That is, an air conditioner does not rewarm the air by exchanging heat with the refrigerant. Rather, it delivers cold air to the house. The integration of heat recovery makes the process far more efficient than it would otherwise be. As a specific illustration, if one wanted to cool room temperature nitrogen to −180° C. and then warm it again with countercurrent heat exchangers, and if one assumes an ideal system (no friction, pressure drop, heat losses, and no temperature driving force required in the heat exchanger), no energy is required to do this. As a more realistic scenario, all that is required is to cool the warmer stream by 5-10° C. at the bottom of the cycle. Specifically what is not required is to cool any stream to −180° C. from room temperature, as would be the requirement in a more traditional refrigeration system.

The current invention, when adopted for cryogenic carbon capturing (CCC) of process gas, produces a nearly pure, pressurized $CO_2$ stream and a nearly $CO_2$-free light-gas stream from stationary power process gases. In comparison to oxygen-fired combustion and other well-documented alternatives, the present invention provides improved efficiencies and reduced capital and operating costs. Improved energy efficiencies using the present invention can be achieved through elimination of costly and energy-intensive distillation or comparable purification steps, replacement of costly and energy-intensive $CO_2$ compression steps with comparatively inexpensive and energy efficient pressurization of condensed-phase $CO_2$, storage of energy in the form of high-pressure light gases or liquids, and/or reduction of water usage at processing plants. Reduced capital and operating costs can be achieved through these same means and by removal of impurities (e.g., acids), operation at less severe temperature extremes, enabling cheaper and a wider range of materials of construction, and lower costs associated with smaller volumetric flow rates and less extreme temperature ranges.

II. Methods for Separating Condensable Vapors

An aspect of the invention relates to methods for condensing vapors from a mixed process stream using one or more recuperative external cooling loops (ECLs). FIG. 1 provides an overview of an example method according to one embodiment of the invention. The method 100 includes (i) providing a mixed process stream comprising at least one condensable vapor and at least one light gas or liquid (step 110); (ii) cooling the mixed process stream to a temperature of $T_1$ to cause the condensable vapor to desublimate, using one or more refrigerants in at least one ECL (step 120); (iii) separating the desublimated condensable vapor from the light gas or liquid to form a solid stream and a light gas or liquid stream (step 130); (iv) pressurizing the solid stream (step 140); and (v) cooling the one or more refrigerants using at least a portion of the solid stream, thereby melting the solid stream to form a liquid stream (step 150).

The step of providing the mixed process stream can include providing conduits, pumps, valves, and/or other hardware suitable for delivering a gas from a process plant to a separation unit such as system 100. In an embodiment of the methods, the mixed process stream provided at step 110 is a process gas from a hydrocarbon processing, combustion, gasification, or similar plant, which comprises $CO_2$, $N_2$, and other components. In such a case, it is advantageous to pre-cool the process stream to ambient temperature and remove the moisture in the mixed process stream (not shown in FIG. 1) before the desublimation step 120. The pre-cooling may be achieved by one or more heat-rejection heat exchangers (HRHEs) using water, air, or cooled process streams.

At various temperatures and stages during the sublimation step 120, impurities and contaminants, including mercury, arsenic, cadmium, chromium, nickel, other heavy metals, hydrocarbons, $SO_2$, $NO_2$, HF, and HCl, and other condensable impurities can be removed from the mixed process stream. Impurities can be removed by cooling and condensing the impurities and removing the condensed impurities from the mixed process stream prior to desublimating the condensable vapor. In the embodiment for carbon capturing of process gas, most of the impurities are typically condensed at a temperature lower than ambient, but greater than the temperature at which $CO_2$ condenses. The one or more impurities can be removed using a heat exchanger with an integrated condenser and separator that can remove the condensed impurities as a side stream. Examples of impurities that can be removed include, but are not limited to, $SO_2$, $SO_3$, $NO_2$, HCl, HF, Ar, Cr, Ca, Ni, or Hg. The process gas is then cooled by at least one refrigerant to reach a temperature of $T_1$ where the carbon dioxide in the process gas desublimates to form a desublimated $CO_2$ component and a light gas or liquid component. Some residual impurities condense with the $CO_2$ and, if necessary, can be separated from it in later stages.

At step 130, the desublimated condensable vapor is separated from the light gas or liquid to form a solid stream and a light gas or liquid stream. When process gas is processed, the desublimate carbon dioxide will accumulate on the surfaces of the vessel or chamber where the condensation is carried out. In one embodiment of the invention, the chamber is configured to allow the solid to be removed from the surfaces of the chamber using mechanical means. The separation techniques of the invention can achieve high removal rates for the carbon dioxide from the process gas. In one embodiment, the present invention removes at least about 95% by weight of carbon dioxide, more preferably at least about 98%, and most preferably at least about 99%.

In one embodiment, the method includes carrying out the condensation in a steady state in which a rate of buildup of desublimated solids is about the same as a rate of removal of desublimated solids. In one embodiment, the removal of condensed vapors is sufficient to allow continuous operation of the system for at least days, weeks, or even months without over accumulating condensed solids in the system.

At the next step 140, the separated solid stream is then pressurized to increase its boiling temperature so that the condensable vapor remains in liquid phase when it is warmed back up to ambient temperature. This step 140 is advantageous because it costs much less energy to compress the solid phase than the liquid or gas phase of the condensable vapor. By compressing it before warming and evaporating the condensable vapor, substantial compression energy can be saved.

At least a portion of the solid stream is then used in step 150 to cool the at least one refrigerant that has cooled the mixed process stream at step 120, thereby melting the solid stream to form a liquid stream. Step 150 is advantageous because it provides a recuperative means to cool the at least one refrigerant in step 120, efficiently recovering the energy used in desublimating the condensable vapor.

Similar to step 150 but not shown in FIG. 1, the condensed vapor can be used to cool refrigerants before and after it melts. Because the energy absorbed during melting of the solid stream is substantial, it is advantageous to apply it to cool a refrigerant that causes the condensable vapors to desublimate at the first place.

Finally, the warmed up liquid stream of the condensable vapor can be further compressed to a temperature suitable for delivery or sequestering (not shown in FIG. 1).

The method can be carried out using compression and expansion equipment commonly found in cryogenic cooling cycles. The refrigerant used in the system may include a mixture of several components, many of which condense at various stages of the process. One benefit of some of the processes described herein is that they can be carried out with little or no modifications to the upstream process (e.g., coal fired power plant), which allows the systems and methods to be built at full scale as bolt-on systems.

Figure 2:
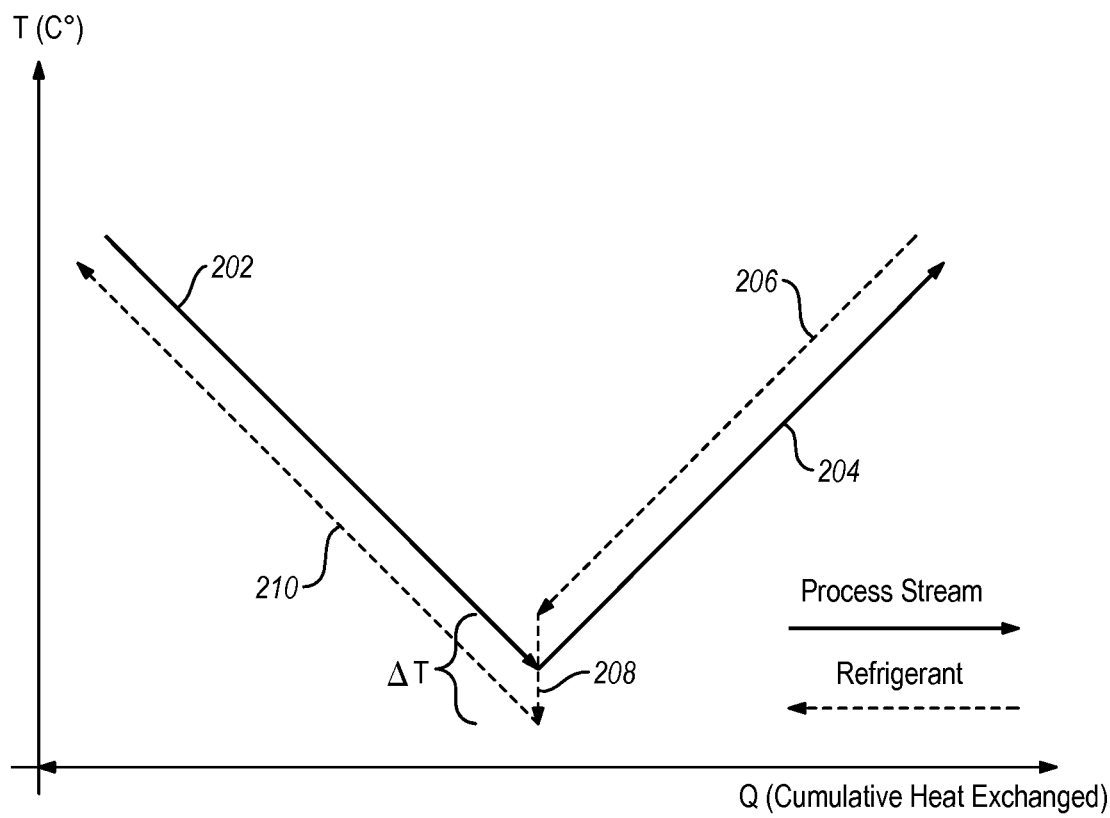
FIG. 2 is a schematic graph of simplified and idealized temperature profiles for a refrigerant stream and a process stream, wherein the latter includes a mixed process stream and separated process streams comprising a light gas or liquid stream, a solid stream and a liquid stream.

FIG. 2 is a schematic graph of simplified and idealized temperature profiles for a refrigerant stream and a process stream, wherein the latter includes a mixed process stream and separated process streams comprising a light gas or liquid stream, a solid stream and a liquid stream. FIG. 2 shows a typical T-Q plot for the temperature of a gas cooling from some initial (room temperature) value to a cold temperature as a function of the amount of heat removed, then as the amount of heat absorbed, Q. The negatively sloped lines on the left 202 and 210 correspond to the cooling stages of the mixed process stream; the positively sloped lines 204 and 208 on the right show the warming stages of the separated process streams. If the heat capacity is independent of temperature and there are no species changing phases, the cooling cycle forms a straight line on a plot such as this.

In FIG. 2, the process stream moves from left to right as indicated by the arrows on 202 and 204. The external refrigerant flows from right to left as indicated by the arrows of 206 and 210. From right to left, the external refrigerant (temperature profile corresponding to 206) is first cooled by the separated process streams (temperature profile corresponding to 204), and then cools (210) the mixed process stream (202). The refrigerant temperature must change from a few degrees above that of the light gas or liquid to a few degrees below that of the light gas or liquid. This temperature drop 208 is achieved by expanding the one or more refrigerants before using them to cool the mixed process stream and compressing them thereafter. In this case, the pressurized refrigerants are cooled by the separated process streams prior to its expansion, so the expansion supports only a relatively modest temperature drop, which represents a relatively small fraction of the total energy loss in this process.

Figure 3:
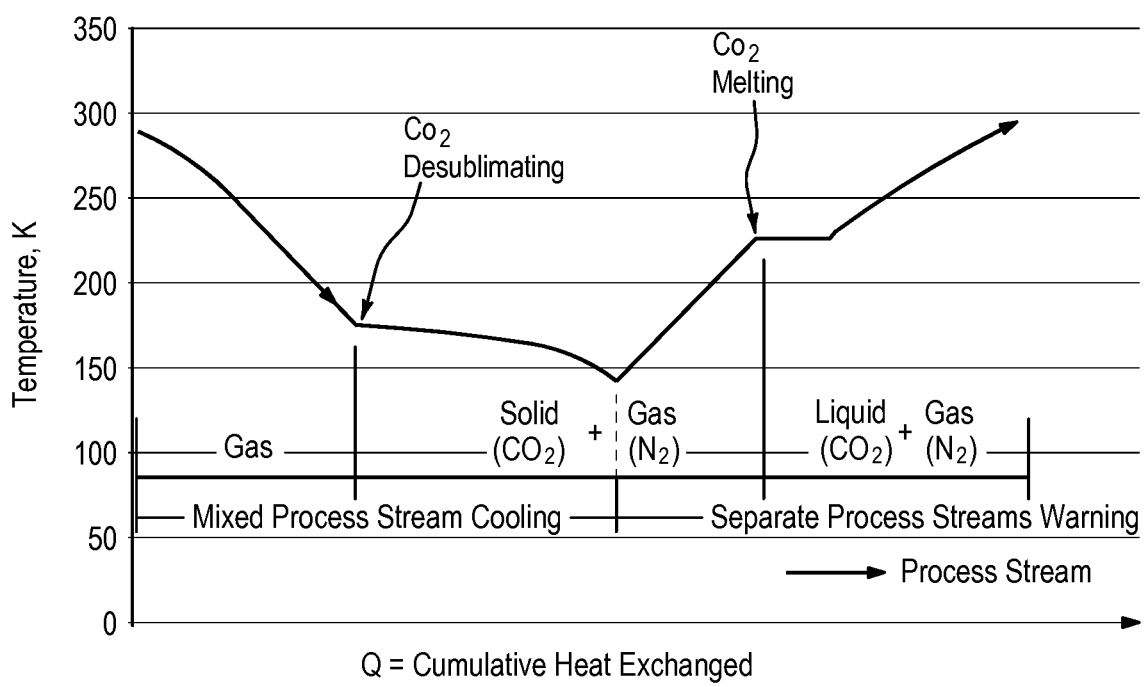
FIG. 3 illustrates a schematic graph of the temperature profile for a process stream comprising $CO_2$ and $N_2$.

In some systems, the process gases may generate more complex temperature profiles such as the temperature profile shown in FIG. 3. While the more complex profiles may require more sophisticated heat exchanger design and engineering, the use of an external cooling loop remains the same. The work required to carry out the process is relatively small compared to the overall changes in temperature it experiences and, except for the inefficiencies in compressors and heat exchangers minimum work is required for the process.

Based on the empirical temperature profile of process gas, further improvements of heat exchange efficiency can be achieved by matching the temperature profiles between the warmer stream and the cooler stream. In an embodiment taking advantage of this improvement, the composition and pressure of the at least one refrigerants are configured so that at least a portion of the one or more refrigerants condenses at a temperature slightly above the $CO_2$ melting temperature, as indicated in FIG. 3. In a preferred embodiment, the condensing temperature of the refrigerant is less than 20, 10, 5° C. above the melting point of the condensable vapors and/or and greater than or equal to 0, 1, or 5° C. above the melting point of the condensable vapors or within a range of any of the foregoing upper and lower end points. In another preferred embodiment, the condensing temperature of the refrigerant is 0-10° C. above the $CO_2$ melting temperature.

Similarly, the refrigerants evaporation temperature can be matched to $CO_2$ desublimating temperature to maximize efficiency of heat exchange during cooling of the $CO_2$. In a preferred embodiment, the method includes vaporizing at least a portion of the one or more refrigerants in a temperature range of 0-20° C. below the $CO_2$ desublimating temperature, as indicated in FIG. 3. As stated above, it would be advantageous to use the same refrigerant in the $CO_2$ desublimating heat exchange step and in the $CO_2$ melting heat exchange step, because the phase changes of the $CO_2$ correspond to a large portion of energy exchanged in the cooling-warming cycle.

To integrate these temperature profiling techniques, a preferred embodiment of the invention includes two stages for cooling the process streams and two stages for cooling the refrigerants: cooling the mixed process stream to a temperature of $T_2$ before cooling it to $T_1$ using at least one outer-loop refrigerant, wherein $T_2 > T_1$; further cooling the mixed process stream to a temperature of $T_1$ using at least one inner-loop refrigerant, causing the condensable vapor to desublimate; cooling the at least one inner-loop refrigerant using at least a portion of the solid stream, thereby melting the solid stream to form a liquid stream; and cooling the at least one outer-loop refrigerant using at least a portion of the liquid stream and/or at least a portion of the solid stream.

In this embodiment, to match the temperature profile of the inner loop refrigerant with that of $CO_2$, warming and cooling of the inner loop refrigerant further comprises vaporizing the inner-loop refrigerant in a temperature range of 0-20° C. below the desublimating temperature of the condensable vapor, and condensing the inner-loop refrigerant in a temperature range of 0-20° C. above the melting temperature of the solid stream or within a range of any combination of 0, 1, or 5 and 20, 15, 10, or 5° C. above or below the desublimating temperature of the condensable vapor.

III. System for Separating Condensable Vapors

A. System Configuration

Figure 4:
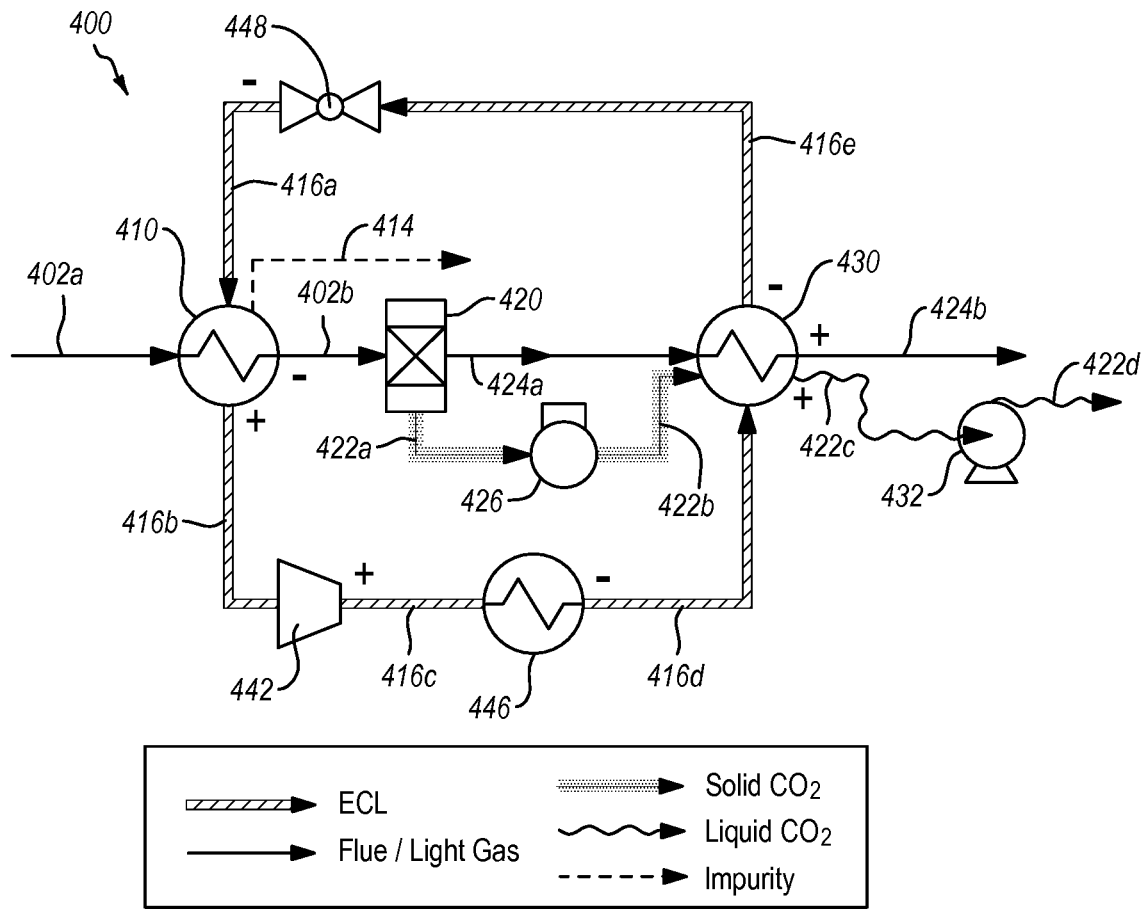
FIG. 4 is a flow diagram of a system with one external cooling loop (ECL) for separating condensable vapors from gases.

FIG. 4 is a flow diagram of a system with one external cooling loop (ECL) for separating condensable vapors from light gases or liquids. System 400 includes a source for a mixed process stream 402a comprising at least one condensable vapor (e.g., $CO_2$) and at least one light gas or liquid (e.g., $N_2$ or $CH_4$). It also includes at least one external cooling loop (ECL) comprising an expansion device 448, a desublimating gas refrigerant heat exchanger (D-GHE) 410, a compressor 442, a recuperative melting heat exchanger (R-MHE) 430, and at least one refrigerant circulating in the at least one ECL, forming an ECL refrigerant stream 416a-e at different cooling stages with various temperatures.

In this and subsequent process flow diagrams, the temperature and process changes in the streams appear in separate heat exchangers. In practice, many of these heat exchangers and other process elements can be combined to improve efficiency and reduce overall footprint. Specifically, most of the compressors would preferably be combined with their down-stream heat exchangers to form a multi-stage compressor with inter-stage cooling. Also, many of the heat exchangers can be combined into multi-stream, single unit or staged unit designs that provide more efficient operation and control.

The system outlined in FIG. 4 mainly teaches the concepts of the ECL process. A more detailed description appears later in this document in conjunction with FIG. 6 that teaches some of the more subtle details of construction and operation.

The system is drawn with separate heat exchangers cooling and warming the process gas. These heat exchangers effectively represent the recuperative heating/cooling aspects of the system, but in practice they are preferably built into a single heat exchanger.

The system is drawn with a single heat exchanger for the process gas cooling stage and another single heat exchanger for the process gas warming. In practice, several heat exchangers of differing size and design would be used to accommodate changes in process gas density and different heat exchanger mechanism. In particular, several heat exchangers in this process involve phase changes (desublimation, melting, refrigerant condensation, and refrigerant boiling) and associated differences in design. Normal sensible heat systems are widely available in the industry. Desublimating systems are subjects of other patents by this organization and are described in detail in them.

Figure 5:
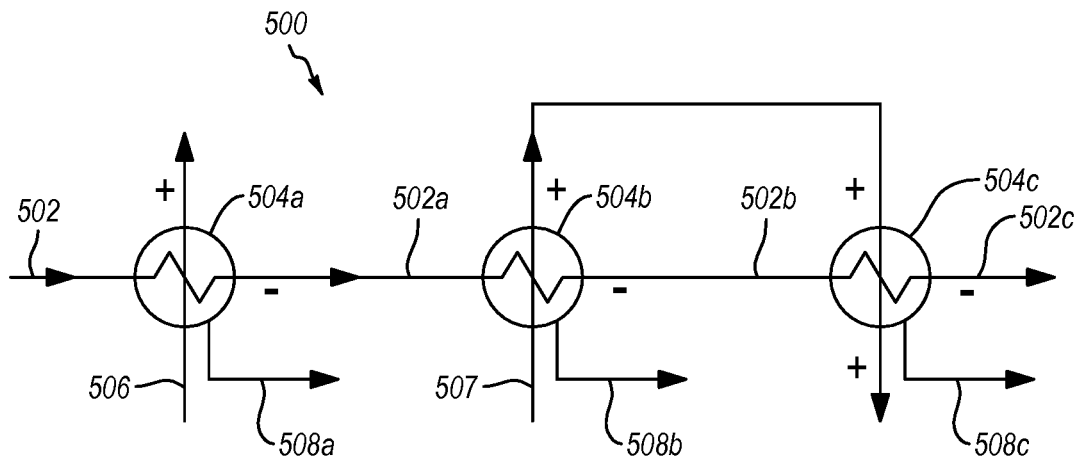
FIG. 5 is a schematic diagram of an upstream heat exchanger (UHE) unit for cooling a mixed process stream upstream of a desublimating gas refrigerant heat exchanger (D-GHE)
Figure 6:
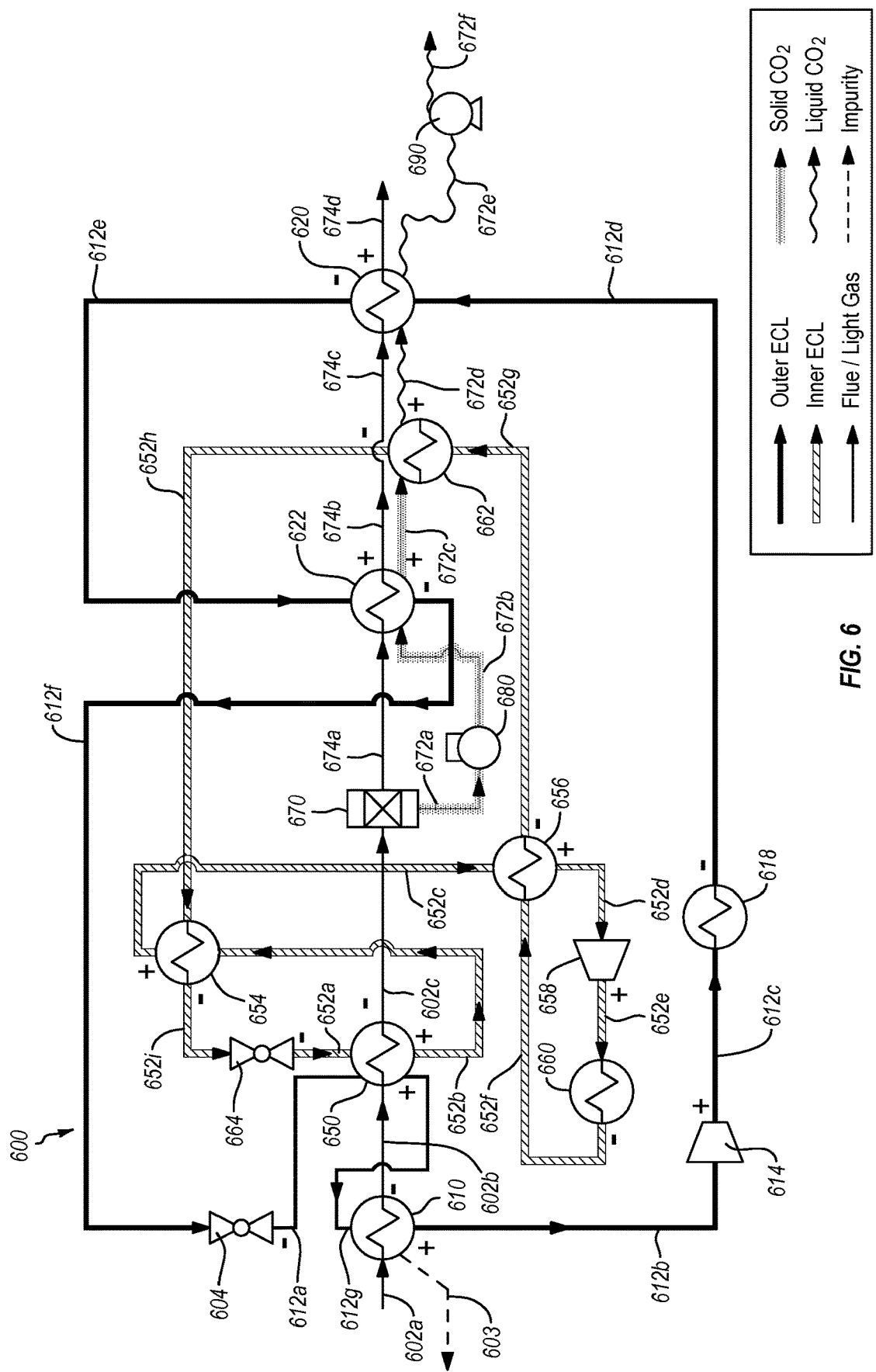
FIG. 6 is a flow diagram of a system with two ECLs for separating condensable vapors from gases.

The system preserves energy by cyclically warming and cooling ECL refrigerant stream 416a-e in various heat exchanges, thereby cooling the mixed process stream and recuperating the energy spent on the cooling. The expansion device 448 first reduces the pressure of the refrigerant stream 416e, causing the refrigerant to boil and evaporate, producing a gaseous refrigerant stream 416a. The expansion device 448 may be an expansion valve, a turbine, or other forms of expansion devices. Heat is absorbed during the phase change of the refrigerant and temperature of the gaseous refrigerant stream 416a drops, as indicated by the "−" sign marked on the refrigerant stream 416a as the output of expansion device 448. In the flow diagrams of FIG. 4-6 illustrating heat exchangers, a "+" sign on an output stream indicates that the temperature of the stream rises as a result of heat exchange, and a "−" indicates that the temperature of the stream decreases.

The gaseous refrigerant stream 416a cools the mixed process stream 402a in the D-GHE 410, eventually reaching the frost point and thereafter desublimating the vapor, yielding a solid stream 422a and a light gas or liquid stream 424a. A separator separates the two streams. Although the expansion device 448 is illustrated as separate from the D-GHE 410 in FIG. 4, in practice they can be thermally coupled to allow heat to transfer from the mixed process stream 402a to the refrigerant during the evaporation of the refrigerant.

The gaseous refrigerant stream 416b gains heat from the mixed process stream in the D-GHE 410, cooling the mixed process stream and causing the condensable vapor to desublimate. Compressor 442 compresses it, which decreases the volume, increases the pressure and temperature of the gas, while maintaining nearly the same entropy for stream 416c relative to stream 416b. The heat generated from the compression is transferred to an ambient coolant (e.g., water) in a heat-rejection heat exchanger (HRHE) 446, cooling the gaseous refrigerant stream 416d. Preferably, this heat exchanger is integrated with the compressor in a multi-stage, interstage cooled process. Then a recuperative melting heat exchanger (R-MHE) 430 further cools the refrigerant stream 416d using the cooled and separated solid stream 422b and light gas or liquid stream 424a, yielding a condensed phase refrigerant stream 416e with a lower entropy than 416b. The refrigerant stream 416e is then expanded by 448 again, resulting in decreased pressure and temperature, starting a new cycle of the ECL.

In an embodiment of the invention, the at least one refrigerant comprises $CF_4$, ethane, nitrogen, argon, methane, established commercial refrigerants, Montreal-protocol-compliant refrigerants, or any combinations of these.

In another embodiment, at least a portion of the at least one refrigerant is configured to condense near −55° C. at a higher pressure and vaporize near −120 to −165° C. at a lower pressure, paralleling the temperature profiles of process gas as nearly as possible.

In one embodiment a system according to the invention is configured to maximize heat transfer efficiency by matching the temperature profiles of the refrigerants and the process streams such that at least a portion of the at least one refrigerant is configured to condense in a temperature range of 0-20° C. above the melting temperature of the solid stream. In another embodiment, at least a portion of the at least one refrigerant is configured to evaporate in a temperature range of 0-20° C. below the desublimating temperature of the condensable vapor.

At various stages and temperature during cooling of the mixed process stream, one or more impurities can be removed as a side stream 414. The separation of the impurities is carried out by selecting a proper temperature and pressure at which the impurity will condense and the other condensable vapors (e.g., $CO_2$) do not condense. Those skilled in the art are familiar with the temperatures and pressures needed to condense impurities typically found in a process stream. These impurities include but are not limited to oxides of sulfur and nitrogen ($SO_2$, $SO_3$, NO, $NO_2$), water at sub-freezing temperatures, halogenated gases (HCl, $HgCl_x$), mercury, arsenic compounds, cadmium, chromium, nickel, other heavy metals, and other impurities common to process gases and of operational, health, or environmental concern. Generally, these compounds desublimate or condense when temperatures of particles or surfaces are at or below the frost or dew points of these compounds. The actual desublimation and freezing points of these compounds when they exist as components of a mixture depend strongly on the mixture composition in ways that are complex, but well known to one skilled in the art of mixture thermodynamics.

The system illustrated in FIG. 4 also comprises a solids separator 420 that separates the desublimated condensable vapor (e.g., $CO_2$) from the light gas or liquid (e.g., $N_2$), forming a solid stream 422a and a light gas or liquid stream 424a. Although the solids separator 420 is illustrated as being separate and downstream from the D-GHE 410, it can be integrated in the D-GHE in practice, so as to allow continuous removal of solids accumulating in the D-GHE.

A solids compressor 426 downstream from the solids separator 420 and upstream from the R-MHE 430 is configured to pressurize the solid stream 422a, which increases the boiling temperature of the solid stream 422b so that the condensable vapor remains in liquid phase 422c when it is warmed back up to ambient temperature. As stated above, this is advantageous because it costs much less energy to compress the solid phase than the liquid or gas phase of the condensable vapor. By compressing it before warming and evaporating the condensable vapor, substantial compression energy can be saved.

The system of the invention then uses the solid stream to cool the refrigerant in the ECL. As the embodiment depicted in FIG. 4, it is advantageous to use both the compressed solid stream 422b and the cooled light gas or liquid stream 424a in the D-MHE to cool the ECL refrigerant stream 416d, melting the solid stream 422b to form a liquid stream 422c and warming the light gas or liquid stream to form a warmed light gas or liquid stream 424b at or near ambient temperature.

The liquid stream of the condensable vapor can then be further compressed by a liquid pump 432, forming a pressurized liquid stream 422d ready to be delivered or sequestered. In an embodiment of the invention, the liquid pump 432 is configured to pressurize the liquid stream to a pressure 422d. The pressure may be greater than 50 bar, 150 bar, 250 bar or 500 bar. $CO_2$ is slightly compressible since it passes reasonably close to its critical point in this process, so the stream temperature rises a few degrees associated with this pumping and the pump energy consumption is slightly higher than the equivalent work required, on room-temperature water for example. The combination of the solids compression and liquid pump reduces process energy consumption dramatically compared to processes that compress the $CO_2$ as a gas.

The invention can be advantageously practiced by pre-processing the mixed process stream before it enters the D-GHE 410. FIG. 5 provides an illustrative example of an upstream heat exchanger (UHE) 502 that can pre-process the mixed process stream, which can include any number of compressors, heat exchangers, fans, pumps, conduits, valves, sensors, controllers, and other components known in the art for cooling, drying, pressurizing, and/or purifying a process stream. The configuration shown in FIG. 5 can be staged any number of times to provide efficient removal of impurities over a range of temperatures, with such staging occurring preferably such that all heat exchange occurs countercurrently or optionally with some or all heat exchanger occurring cross currently or co-currently.

As shown in FIG. 5, an UHE unit 500 includes a plurality of heat exchangers 504a-c. The mixed process stream 502 is first typically cooled to ambient temperatures using water and/or air in one or more cooling processes. For example, water 506 can be used to cool process stream 502 using a first heat exchanger 504a to produce a process stream 502a at ambient temperature. In a second heat exchanger 504b, the mixed process stream 502a is cooled in the second heat exchanger 504b to condense any water vapors that may exists in process stream 502a to produce a dry process stream 502b. A dry stream may also be produced using absorbing beds rather than thermal condensing heat exchangers, as are common in the industry. The process stream 502a can be cooled using any suitable coolant 507. Coolant 507 can be provided from any portion of cooled light gas or liquid stream 424 or condensable vapor liquid stream 422 or provided by non-recuperative techniques known in the art, such as, but not limited to an external refrigeration unit, a salt-solution technique, or a staged cooling technique. A third heat exchanger 504c may be coupled to the second heat exchanger 504b to stage the heat exchange between the process stream 502 and the cooling stream 507. The heat exchangers 504a-c can include a separator for removing condensed water 508a-c. Residual water may be removed using absorption, salt solution, pressurization, or other techniques known in the art.

UHE 500 can also be configured to remove one or more different types of impurities. Impurities are often found in the process streams as a consequence of using natural products such as coal and petroleum to produce the process stream. In one embodiment, the process stream can include, but is not limited to, mercury, NOx, SOx, HCl, residual moisture, combinations of these, and any other impurities known to be present in industrial process streams. In one embodiment, the impurities can be removed from the heat exchangers 504a-c as impurity streams 508a-c.

As stated above, a distinctive advantage of the system of the invention is that it may be practiced without pressurizing the mixed process stream. However, it is possible to compress the mixed process stream to improve cooling efficiency if the disadvantages associated with such compression are addressed properly. In one embodiment, the pressure of the mixed process stream can be relatively low, such as a pressure in a range from about ambient pressure to about 15 psi or ambient to about 10 psi, or ambient to about 5 psi. In an alternative embodiment, the pressure can be relatively high such as in a range from about 5 psi to about 1000 psi or greater or 20 psi to about 500 psi.

To match the temperature profiles of the refrigerants and the process streams to maximize heat transfer efficiency, the invention can be implemented with an inner ECL and an outer ECL as exemplified by the system 600 in FIG. 6. In this double ECL system, cooling of the mixed process streams are staged in a gas refrigerant heat exchanger (GHE) 610 and a desublimating gas refrigerant heat exchanger D-GHE 650, while cooling of the refrigerants are staged through various heat exchangers in the outer ECL and the inner ECL.

Like the single ECL system 400, the double ECL system 600 can also be advantageously practiced by preprocessing the mixed process stream with an UHE 500 to cool the mixed process stream to a temperature near the temperature of the refrigerant in GHE 610 and D-GHE 650.

The ECLs are configured in a manner so that the inner ECL both cools the mixed process stream 602b causing it to desublimate, and warms the separated process streams causing the solid stream to melt, while the outer ECL provides cooling and recovery that complement the inner ECL.

The inner ECL as implemented in the double ECL system in FIG. 6 are similar to the simpler single ECL in FIG. 4, with the addition of two supplementary gas heat exchangers (S-GHE) that uses the residual cooling power of the gas phase refrigerant streams 652b and 652c to cool the warmer streams of the same refrigerant 652h and 652f, respectively. In this embodiment, the inner ECL comprises a first S-GHE 654 immediately upstream from the expansion device 664 and immediately downstream from the D-GHE 650, which is configured to cool the condensed-phase inner-ECL refrigerant stream 652h by warming the gas-phase inner-ECL refrigerant stream 652b. Similarly, the inner ECL also can include a second S-GHE 656 downstream from the first S-GHE 6554 and upstream from a compressor 658, which is configured to use the uncompressed gaseous inner-ECL refrigerant stream 652c to cool the compressed gaseous inner-ECL refrigerant stream 652f.

In a preferred embodiment of the system as implemented in FIG. 6, at least a portion of the inner-ECL refrigerant is configured to evaporate at a lower pressure in a temperature range of 0-20° C. below the desublimating temperature of the condensable vapor and condense at a higher pressure in a temperature range of 0-20° C. above the melting temperature of the solid stream. More preferably, these temperature ranges are 0-5° C., and most preferably, 0-1° C.

In the outer ECL as implemented in the system show in FIG. 6, the expansion device 604 first reduces the pressure of the outer ECL liquid refrigerant stream 612f, causing the refrigerant to boil and evaporate, producing a cold, low pressure refrigerant stream 612a. The boiling of stream 612a can occur at the outlet of expansion vale 604 or within heat exchanger 650. Although the expansion device 604 is illustrated as separate from the GHE 610 in FIG. 6, in practice the devices can be thermally coupled to allow heat to transfer from the mixed process stream 602b to the refrigerant during the evaporation of the refrigerant. Stream 612a is introduced into D-GHE 650 where it absorbs heat from process stream 602b and causes desublimation of process stream 602b (alone or in combination with the stream 652a).

Stream 612a exits D-GHE 650 as gaseous stream 612g, which enters gaseous refrigerant heat exchanger (GHE) 610, cooling the condensable vapor of stream 602a to a temperature $T_1$, yielding a cooled mixed process stream 602b. At this cooling stage, impurities 603 may be removed from the GHE 610. In practice, some pollutants propagate through the system to be collected with the $CO_2$ either as fugitive particles and vapors or because they do not completely condense prior to the $CO_2$ removal stage. Therefore, not all impurities will exit the system in stream 603, though many of them will.

The gaseous refrigerant stream 612g exits GHE 610 as stream 612b. Stream 612b is then compressed by a compressor 614, which decreases the volume, increases the pressure and temperature of the gas, while maintaining the same entropy for stream 612c relative to stream 612b. The heat generated from the compression is transferred from the gaseous refrigerant stream 612c to an ambient coolant (e.g., water) in a heat-rejection heat exchanger (HRHE) 618, forming a cooler gaseous refrigerant stream 612d. Then a recuperative liquid-gas heat exchanger (R-LGHE) 620 cools the gaseous refrigerant stream 612d using the liquid stream 672d and the light gas or liquid stream 674c. Next a recuperative solid-gas heat exchanger (R-SGHE) 622 further cools the refrigerant stream 612e using the solid stream 672b and the light gas or liquid stream 674a. In a preferred embodiment, the cooling by the R-LGHE 620 and R-SGHE 622 reduces the entropy of the refrigerant sufficiently to yield a condensed phase refrigerant stream 612f. The condensed phase refrigerant stream 612f is then expanded by the expansion device 624 again, resulting in decreased pressure and temperature, starting a new cycle of the outer ECL.

At various stages and temperature during cooling of the mixed process stream, one or more impurities can be removed as a side stream 603. The system illustrated in FIG. 6 also comprises a solids separator 670 that separates the desublimated condensable vapor (e.g., $CO_2$) from the light gas or liquid (e.g., $N_2$), forming a solid stream 672a and a light gas or liquid stream 674a. A solids compressor 680 downstream from the solids separator 670 and upstream from the R-SGHE 622 is configured to pressurize the solid stream 672a, so that the condensable vapor remains in liquid phase 672e when it is warmed back up to ambient temperature. Finally the liquid stream of the condensable vapor can then be further compressed by a liquid pump 690, forming a compressed liquid stream 672f ready to be delivered or sequestered.

One advantage of the system of the present invention is that it can be installed either as a bolt-on retrofit technology or as an integrated technology. The bolt-on option makes this technology highly attractive for existing power generating facilities. In this configuration, minimal changes to the existing facility are required. The process gas is intercepted prior to the stack and flows through this process without modification of upstream systems. The only major requirement is that enough footprint is available for the new equipment (compressors and turbines).

B. System Equipment

The following discussion of system equipment and system performance are based on results and analysis of both empirical and simulated data.

1. Compressor

Flue gas that enters the process is modeled as only $CO_2$, $N_2$, and $O_2$ for the simple simulations discussed later and includes S—, N—, Cl—, and Hg-containing compounds, and saturated moisture for the complex simulations. A multistage, intercooled compressor operates with a pressure ratio capable of producing minimum temperatures of $-120°$ C. to $-165°$ C., representing ultimate $CO_2$ capture efficiencies that range from 90 to >100%. Capture efficiencies greater than 100% correspond to capturing all $CO_2$ introduced into the light gas stream by processing and some of the $CO_2$ entering the system with air or other background sources. The simulation assumes 8-10 stages with cooling to $25°$ C. between stages, as would be easily achievable if seawater or comparable cooling water sources are available. Warmer cooling water increases the compressor energy demand in well-known ways. Aspen Plus® models this process element rigorously and results appear in this document with compressor polytropic efficiencies ranging from 0.74 (widely available) to 0.92 (best of class). Gas compression represents by far the largest energy-consuming step and capital expense in the process, which in the case of the first process is process gas and in the case of the second is refrigerant. In practice, there are significant issues involved in compressing gases that contain some sour elements, in particular $SO_2$. If a scrubbed process gas is used, the $SO_2$ concentrations should be tolerable. If a raw process gas is used to take advantage of the pollutant removing capabilities of CCC, the compressor must be chosen carefully to avoid corrosion and other interactions with materials. In the processes of the invention, compression occurs on the closed-loop portion of the system, eliminating concerns with sour gases, residual particulate, potentially condensing moisture, and similar complexities with compressing process gas directly. This represents one of the major motivations of the invention.

2. Upstream Heat Exchanger (UHE)

The process gas passes through a multi-stream, multi-stage UHE similar to the system 400 shown in FIG. 4, where it cools as it exchanges heat with the $CO_2$ and light gas or liquid streams near the end of the process, warming these streams back to near room temperature (approximately $15$-$20°$ C.). This multi-section heat exchanger first cools the gas to near $0°$ C., reducing water concentration in the process gas to about 0.7%.

Approximately 10% of the initial process gas is water, and slightly over 90% of this is recovered from a clean process gas as usable water in this section of the heat exchanger, potentially saving overall water usage on the site. To put this in perspective, on a mass basis, the amount of water recovered can approach the amount of fuel fired, which is a substantial flow. A raw process gas will produce a water stream that will include acid components that will need further treating and the concentration of which will depend on $SO_x$ and $NO_x$ contents and the extent to which they react to form acids, except in unusual conditions, the water content of this flow will so greatly exceed the acid content that the latter will present only routine concern.

3. Gas Refrigerant Heat Exchanger (GHE)

The next stage of the heat exchanger is a GHE, such as the GHE 610 in system 600, which reduces the process gas temperature to about $-51°$ C. In this section, the residual water will desublimate on the heat exchanger surfaces if it is not removed prior to its introduction in the heat exchanger and must be periodically removed using techniques discussed above. The water concentration at this point should be about 35 ppm. Pollutants are potentially removed in this section as well. If they form equilibrium products, $NO_x$, $SO_x$, Hg, HCl and similar compounds are essentially quantitatively removed in this section of the heat exchanger (less than 1 ppb of each left in the gas stream), creating a liquid and solid stream with high corrosion potential and significant need for treatment. However, having these all in one relatively concentrated stream places the pollutant cleanup conveniently in one place. Furthermore, some of them may be in forms that are useful as marketable byproducts.

Impurities such as metals and acids can be removed by condensing the impurities at a desired temperature and pressure prior to condensing the carbon dioxide and removing it from the process gas. In many cases, pollutants can be removed with far greater efficiency than conventional systems. Specifically, $SO_x$, HCl, $NO_2$, and Hg removal efficiencies approach 100% with the proposed process without any additional capital and only minor operating expenditures. For example, the heat exchanger used to cool the condensed gas stream can include a condenser separator for removing the impurities from the system. Removing the condensed impurities from the system prevents the impurities from being transported downstream and mixed with the condensed carbon dioxide, which would then require separating the impurities from the carbon dioxide in a separate process (e.g., distillation), which significantly adds to the cost of the system.

All of the foregoing impurities mentioned condense at the pressures and temperatures above those of the $CO_2$ removal. Condensing the impurities and removing them from the system at a temperature the $CO_2$ frost point—the point at which $CO_2$ begins to condense—the concentrations of the impurities remaining in the gas phase can be reduced to a few parts per million (depending on pressure and moisture content). In one embodiment, the concentration of the impurities in the purified condensed gas stream (which includes the carbon dioxide) is less than 100 ppm, more preferably less than 10 ppm, and most preferably less than 1 ppm.

Consequently, the purity of the carbon dioxide stream can have a purity within the foregoing ranges, without the need to perform distillation. The impurities can be removed from the process as liquids or solids, most of which have commercial value.

4. Desublimating Gas Refrigerant Heat Exchanger (D-GHE)

The last process gas cooling stages reduce the process gas temperature as low as possible using a D-GHE (e.g., 650), which is about −120° C. to −165° C. with some variation depending on overall target removal efficiency.

The desublimating heat exchangers used here could be one of several designs previously described by the inventors including heat exchangers that use a fluid bed, bubbler, or a spray tower designs. In a preferred embodiment, the system is a an efficient, steady-state system that do not require batch-wise operations.

5. Solid Separator

Figure 7:
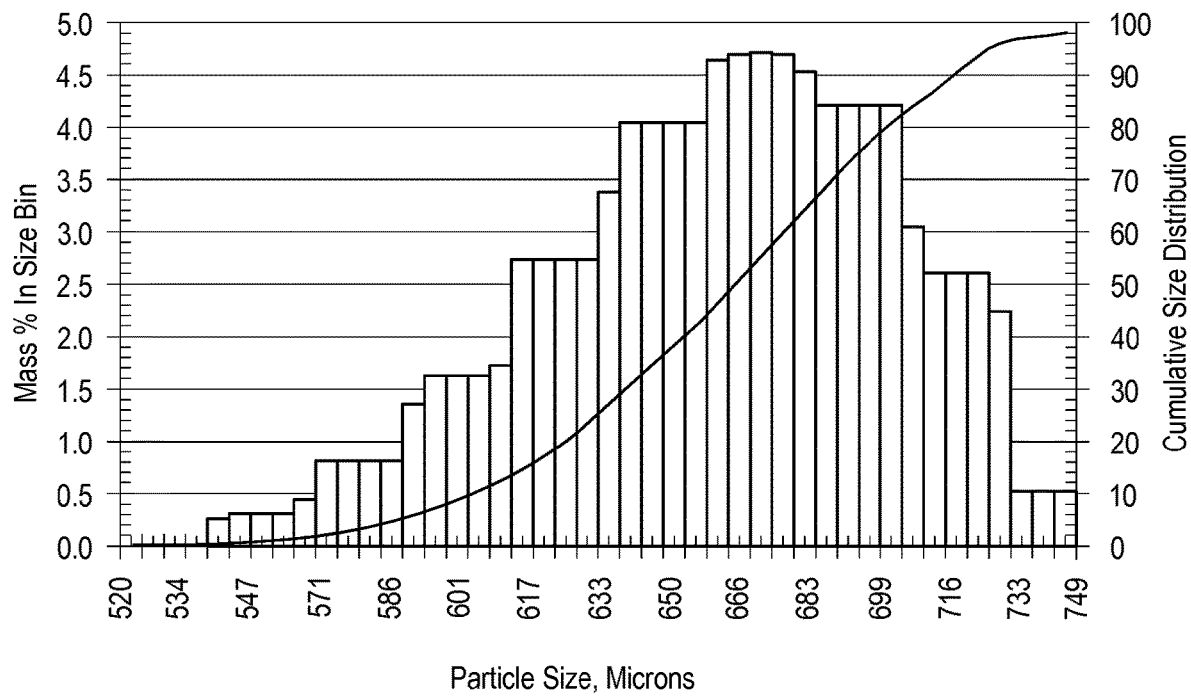
FIG. 7 is an empirical particle size distribution plot of solid particles formed in the separation process of a laboratory-scaled system implemented according to the invention.

During cooling in the GHE and D-GHE, particles formed in suspension are separated from the light gases or liquids. Recent laboratory experiments provide an indication of the particle size distributions formed during cooling of simulated and real process gases. In situ measurements of particle size at the exit of laboratory-scale heat exchangers indicate that the particle sizes are approximately 600-750 microns as shown in FIG. 7.

The following means are examples of means for separating a condensed $CO_2$ component from the light-gas component. For example, the mechanical mechanism for removing solid $CO_2$ can be a mechanical scraper, piston, plunger or other device that scrapes the walls of a cylinder, drum or other surface. The mechanical mechanism can be a screw mechanism that scrapes the walls of a tube and/or moves the solid material in a desired direction. In another embodiment, the mechanical system can be a piston or similar plunger that scrapes the walls of a cylinder of similar shaped surface. In another embodiment, the mechanical system can scrape the outer walls of a surface on which desublimation occurs. In another embodiment, the mechanical mechanism can be a bag filter or a wire mesh that collects solid $CO_2$ and is then intermittently shaken by a drive motor. In an alternative embodiment, the solid $CO_2$ can be filtered using a cyclone separator that separates the solid $CO_2$ from the light-gas component according to weight. Bag filters, the mechanisms for shaking bag filters, and cyclone separators are known in the art.

Condensed-phase $CO_2$ is sufficiently soft that there is little risk of mechanical binding or wear. Primary disadvantage of the mechanical means above is the added complexity of moving parts operating at low temperatures.

An alternative means of $CO_2$ removal utilizes a vertical- or horizontal-tube fluid bed heat exchanger, which has the advantage of both increasing heat flux relative to a pure-gas system and providing much larger surface area for desublimation in the form of the fluid particles. In this design, process gas enters the bed-portion of the fluid bed while a refrigerant (e.g., cooler process gas or a closed-loop refrigerant) passes through the inside of the tubes of the heat exchanger.

In one embodiment, the solid $CO_2$ component is condensed on particles of solid carbon dioxide. The particles of $CO_2$ provide a surface for the condensed $CO_2$ component to collect on. In one embodiment the particles can form a filter through which the light-gas stream passes.

A recently developed $CO_2$ removal means involves collecting $CO_2$ in contacting fluids that suppress its melting point and subsequently separating the $CO_2$ from the fluid or fluid mixtures. The separation can be significantly aided by the considerable dependence of liquid $CO_2$ density with pressure and temperature. In many cases the $CO_2$-fluid system forms two or more liquid phases. In this configuration, $CO_2$ will condense as a liquid in the mixture at cryogenic temperatures, the liquid will be pressurized, and the high-pressure $CO_2$ will be separated from the liquid at high pressure and possibly a different temperature, typically separated at the lowest temperature in which both components form a liquid. Fluids with particular potential for such use include, but are not limited to, methylcyclopentane, methylcyclohexane, and liquids with similar or lower vapor pressures and similar or lower viscosities at the lowest $CO_2$ separating temperatures.

6. Solids Compressor

A solids pressurization step increases the solids pressure to at least 7 bars (or at least the $CO_2$ triple point pressure) and preferably to 70 bars after solids separation from the light gas or liquid. This both expels trapped gases in the solids stream and allows the $CO_2$ to melt into a liquid phase upon heating rather than re-sublimate into vapor. Solid and liquid compression is far less energy intensive, especially over these pressure ratios, than is gas compression. Solids compression and transport techniques include straight- or tapered-bore auger systems, progressive cavity pumps, one or several compression rams in series, and similar solids handling devices. $CO_2$ is malleable and soft, making it relatively easy to compress and expel gases and to extrude through dies or tubes.

7. Recuperative Heat Exchangers

After $CO_2$ separation, the light gas or liquid stream passes through the recuperative solid-gas heat exchanger (R-SGHE) and/or the recuperative liquid-gas heat exchanger (R-LGHE), returning to near ambient temperature. The solids stream also passes through the R-SGHE and the recuperative melting heat exchanger (R-MHE), where it melts to form a liquid in the R-MHE.

The separated gas and solid streams must remain physically isolated from each other to prevent remixing while being thermally coupled to avoid entropy generation and energy losses associated with heat transfer across large temperature differences. When the solid $CO_2$ melts, it will stop temperature increases in both streams (since they are thermally coupled) until all solid is converted to a liquid. The stream on the opposite side of the heat exchanger must parallel this temperature profile, ideally differing from it by only a few degrees. This requires a phase change or similar nearly isothermal heat transfer in the opposite stream. In an embodiment of this invention, the external refrigerant working fluid is a multi-component mixture that vaporizes near −55° C. at the high pressure and vaporizes near −120 to −165° C. at the lower pressure in the loop, matching the temperature profiles of the process gas. Examples of mixtures include, but are not limited to, $CF_4$, ethane, nitrogen, argon, methane, established commercial refrigerants, Montreal-protocol-compliant refrigerants, or any combinations of these. The specification of such mixtures is within the scope of someone skilled in the art in refrigeration systems.

This internal cooling loop could operate in stages, with different refrigerants in different temperature regimes.

Figure 8:
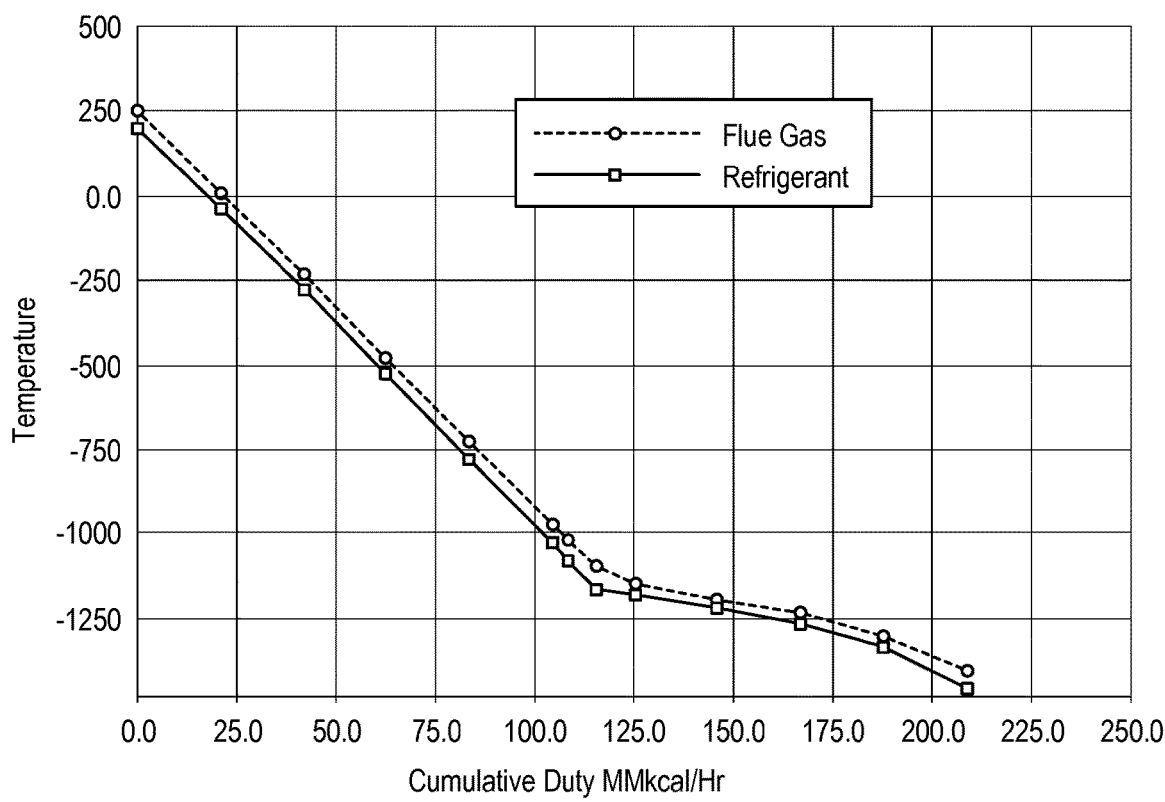
FIG. 8 shows the simulated temperature profiles of a process gas stream and a mixed refrigerant stream in a simulated heat exchanger that cools the process gas stream and warms the refrigerant stream.

The system prevents temperature profile cross-over and maintains small, consistent, and positive temperature differences between the warm and cool streams in the heat exchangers. The current invention achieves this by modifying the temperature profiles using an external refrigeration cycle that transfers some of the heat of melting to lower temperature. In an ideal cycle, the system would be as efficient as the systems analyzed above if the temperature differences can be maintained at a constant 5-10° C. difference. Either a mixed refrigerant working fluid or staged cooling cycles can do this. As an example, the predicted process gas cooling and mixed refrigerant warming heat exchanger profiles in this process appear in FIG. 8, in which the temperature difference varies from about 3 to 7° C. and averages about 4° C. despite the relatively complex shape of the process gas cooling (top) curve. Advantageous to this heat exchanger design is to construct both heat exchangers so they have similar performance characteristics using one refrigerant mixture or using staged or supplemental refrigerants.

Those skilled in the art will recognize that the systems described herein show single heat exchangers and separated heat exchangers that in practice may be multiple heat exchangers, staged heat exchangers, or combined heat exchangers to improve efficiency. In general, cold heat exchangers are generally positioned in the same room or location and warmer heat exchangers are placed together in a warmer room. The particular layout of the heat exchangers in the figures is drawn in a way to provide clarity to the process flow, not necessarily the most efficient layout or configuration of components.

The various heat exchangers described herein have been given names such as "gas heat exchanger"

IV. Thermodynamics of the Methods and Systems

A. Separation Energy

The cryogenic separation process requires energy for purification and for pressurization. A Gibbs energy or availability analysis yields an expression for the minimum energy associated with separating one or several inlet gas streams (assuming no heat of mixing) into several outlet streams with differing compositions. The derivation indicates that the energy is completely due to the change in entropy as there is no enthalpy change if the heats of mixing are zero.

Assuming an initial 14% $CO_2$ dry process gas stream with a pure product, the purification energy is about 0.163 and 0.149 GJ/ton of collected $CO_2$ at 100% and 90% capture, respectively. This energy represents the change in Gibbs Energy or availability associated with separating a mixed gas into purified components. This energy is entropy dominated and is inherent in any separation technique.

B. Condensation

The $CO_2$ in the product stream is at 120-150 bar pressure and, at this pressure and room temperature, the pure $CO_2$ stream is a liquid barely below its critical point. The energy change associated with this phase change must also be supplied at some point by any separation process. This is 0.223 GJ/ton $CO_2$ captured (the difference in Gibbs energy between the gas and liquid at room temperature). This differs somewhat from the latent heat of vaporization because of the volumetric change associated with condensation.

C. Condensed-Phase Pressurization

Pressurization energy for a nearly incompressible solid or liquid is very small, about 0.01 GJ/ton for $CO_2$. The compression energy is very low for a completely incompressible material, which closely approximates most solids and liquids far from their critical points. This small pressurization energy is a major feature of the embodiments of the invention and represents a large energy savings compared to other processes. For example, gaseous $CO_2$ pressurization from 1 to 150 bar requires 0.488 GJ/ton $CO_2$ in an adiabatic compressor with perfect efficiency. The entire process of the present invention in many circumstances consumes less energy than this. Interstage cooling of the compressor can lower the energy requirement of gaseous pressurization, but it cannot get below 0.226 GJ/ton $CO_2$ even in an isothermal, perfectly efficient compressor.

D. Sum of Ideal Steps

The minimum energy for the entire process based on these steps is 0.396 and 0.344 GJ/ton $CO_2$ captured for 100% and 90% capture of a 14 percent initial $CO_2$ stream and a pure product, respectively. No process can achieve the separation with less energy than this. Of this amount, about 40% is associated with entropy losses by purifying the stream and about 60% is associated with the phase change and pressurization. Significantly, by avoiding internally circulating processes the process described herein achieves a thermodynamic minimum.

E. Compressor Losses

Real compressors are neither isothermal nor perfectly efficient. Compressor efficiencies as high as 0.92 and multi-staged compressors with interstage cooling and as many as 8 stages exist commercially, very recently even in the sizes needed for this application. However, more realistic compressor efficiencies and interstage cooling assumptions provide more robust estimates of energy consumption. Compressors with polytropic efficiencies of 0.87 are widely available, especially at the size of this equipment in commercial application.

Interstage cooling is at least as important as the polytropic efficiency however. Even a perfectly efficient compressor warms gases during compression, and for nitrogen flow with a pressure ratio of 5-8, about 23% of the compression energy in an uncooled compressor warms the gas. Interstage cooling can reduce this number, in limit of infinite stages and perfect cooling to zero or the equivalent of isothermal compression. However, real systems can reduce it by about 22%/number of stages.

Assuming a reasonable (six stage) compressor with 87% polytropic efficiency, the effective ratio of work to functional pressure increase in the fluid is about 0.84. Our calculations assume a ratio of 0.77 to provide conservative estimates. The compressor effectively delivers all of the energy needed for condensation and separation. It additionally delivers energy for a finite temperature difference in the heat exchangers. For the separation and condensation, the additional required compressor energy is 0.075 and 0.118 GJ/ton of $CO_2$ produced assuming effective efficiencies of 0.84 and 0.77, respectively. This raises the minimum separation energy for 100% and 90% capture in a pure stream to 0.514 and 0.446 GJ/ton $CO_2$ collected, respectively, assuming the conservative 0.77 effective compressor efficiency.

F. Sensible Heat Losses

Typically a 5-10° C. temperature difference is needed to drive the heat exchangers in the process of the present invention. This temperature difference should be maintained in all stages of the heat exchangers. Increasing the temperature difference allows smaller heat exchangers to be built but decreases energy efficiency since the entropy increase in the system is proportional to the temperature difference across which heat is exchanged. The tradeoff between equipment size (capital cost) and energy loss (operating costs) generally results in about a 5° C. temperature difference between the flows in an industrial, countercurrent heat exchanger. This net temperature difference must also be supplied by compression, which is less than 100% efficient and which occurs typically at less than isothermal conditions, both of which lead to increased energy consumption.

Importantly, the required cooling is only the 5-10° C. needed to maintain a temperature difference in the heat exchangers. If this is placed in the system at the lowest temperature point via gas expansion and/or refrigerant vaporization with Joule-Thompson cooling, for example, this temperature difference is sufficient to drive the entire heat recovery heat exchanger system. This is in stark contrast to trying to cool the incoming gas via refrigeration from room temperature to the lowest temperature, the latter typically varying from −120 to −130° C. If we drive a system in which the process gas is its own coolant, the 5-10° C. sensible cooling adds an additional 0.035 to 0.07 GJ/ton captured $CO_2$ (for 5 and 10° C., respectively) energy load, assuming it can be maintained throughout the heat exchanger. Assuming this and the heat of phase change are provided by a 77% efficient compressor operating isothermally, this corresponds to an additional 0.04 to 0.08 GJ/ton captured $CO_2$ for the sensible heating. If an external refrigeration loop is used, approximately twice as much sensible heat will be needed (half for the refrigerant and half for the process gas), raising the total to 0.56 to 0.60 GJ/ton $CO_2$.

V. Examples

The following examples demonstrate the performance of various systems implemented with laboratory scale equipment or simulation according to the invention. They also show the comparisons to other processes designed to accomplish the same ends.

Example 1

Example 1 shows the merit of two cryogenic carbon capture processes implemented according to the invention such that it is configured as the double-ECL system shown in FIG. 6 and with an UHE analogous to that shown in FIG. 5. One of the processes is implemented with a simple assumption that the process stream contains $N_2$, $O_2$, and $CO_2$; the other is under a complex assumption that the process stream further contains S, N, Hg, and Cl impurities. The systems also meet the general equipment requirements as stated above.

Table 1 below summarizes all essential stream conditions and figures of merit. The major equipment energy requirements also appear in Table 1. One of the notable advantages of the invention is that it operates at temperatures considerably warmer than air separation units and therefore enjoys a much broader choice of materials since most common materials of construction are appropriate in the cryogenic carbon capture conditions but many become too brittle or otherwise inappropriate for air separation unit (ASU) systems. The waste streams generated in each of the components is included in the equipment descriptions.

TABLE 1

| Variable | Units | Simple System | Complex System |
| --- | --- | --- | --- |
| $CO_2$ In | kg/hr | 706073 | 730057 (13.5%) |
| $CO_2$ Captured | kg/hr | 702122 | 657108 |
| Compression Energy | kW | 175626 | 160300 |
| Expansion device Energy | kW | −58340 | −57444 |
| Pump Energy | kW | 1988 | 1486 |
| Supplemental Refrig Energy | kW | — | 17600 |
| Specific Energy | GJ/tonne | 0.601 | 0.620 |
| $CO_2$ Capture Efficiency | — | 0.995 | 0.90 |
| $SO_x$ Capture Efficiency | — | — | 1.0000 |
| $NO_x$ Capture Efficiency | — | — | 1.0000 |
| $Cl_2$/HCl Capture Efficiency | — | — | 0.001 |
| Hg Capture Efficiency | — | — | 1.0000 |
| Usable $H_2O$ Recovery | — | — | 0.91 |
| $CO_2$ Purity in Captured Stream | — | 1.0000 | 1.0000 |

Example 2

Example 2 uses both laboratory experiments and simulations to determine carbon capture efficiency as a function of temperature in a system implemented according to the invention. Example 2 also shows the energy consumptions as functions of capture efficiency and compression efficiency.

Figure 9:
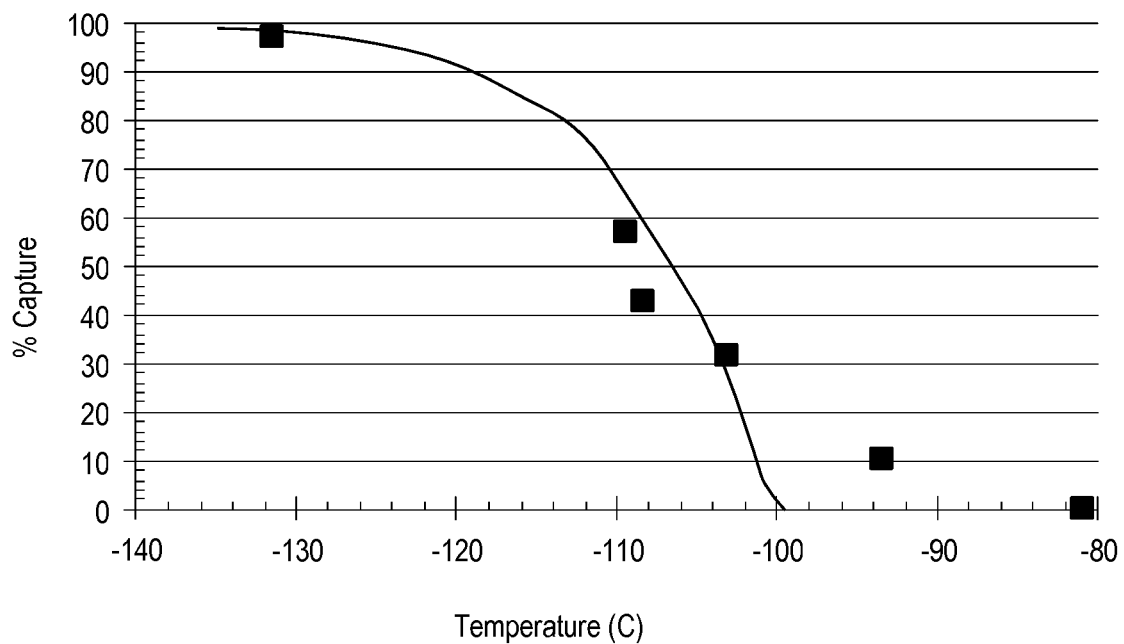
FIG. 9 illustrates the empirical and simulated carbon capture efficiency as a function of cooling temperature of a system implemented according to the invention.

The systems are implemented with configuration similar to those in Example 1. Repeated laboratory experimental measurements using both simulated and actual coal process gas and using both simulated gas expansion devices (gas expansion through nozzle with external cooling) and refrigerant expansion devices have demonstrated capture efficiencies as shown in FIG. 9, where the discrete data points show empirical data and the solid line represents model prediction matching the empirical data.

Figure 10:
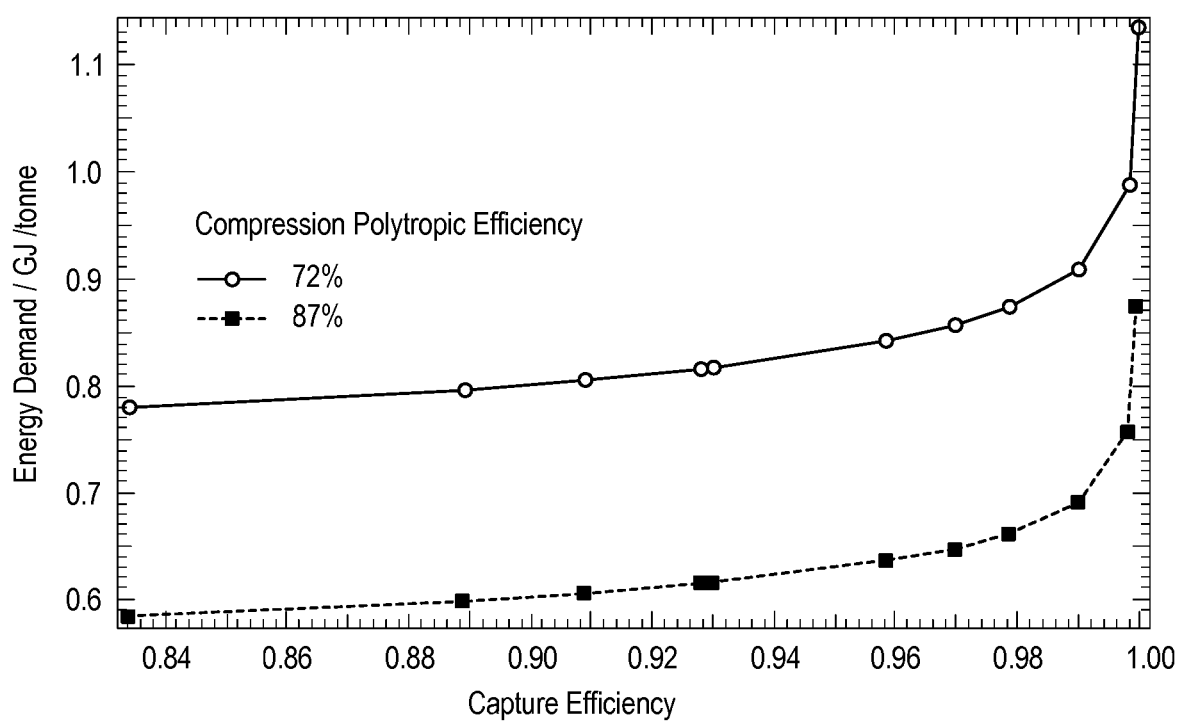
FIG. 10 shows the energy demand of a simulated system as functions of capture efficiency and compression efficiency.

FIG. 10 summarizes the specific energy consumption as functions of capture efficiency and compression efficiency—two prominent parameters, assuming an average 10° C. temperature difference in the heat exchangers and typical specifications for the process gas composition (13.5% $CO_2$ on a dry basis), pump and expansion device performance, etc. Significantly, CCC is capable of very high capture efficiencies without large increases in energy demand. For example, capture efficiencies of greater than 99.7% are achieved when the coolest temperature is below −143° C., and these correspond to capturing all of the $CO_2$ produced from coal combustion and a fraction of that in the incoming air, where the nominal concentration of $CO_2$ in the air is 380 ppm. This can be achieved with a relatively modest increase in the specific energy requirements for the process with CCC.

Forms of energy used in alternative processes can include mostly work (oxy-fuel and gasification processes) or a combination of work and heat (solvent absorption processes). This complicates their direct comparisons. Conversion of work to heat or primary energy requires process-specific parameters, specifically the cycle efficiency of producing work. On a primary energy basis, the specific energy of the CCC process as an embodiment of the invention is about 1.62 GJ/tonne of captured $CO_2$.

Oxycombustion and amine absorption processes require about 1.8 and 2.2 GJ/tonne $CO_2$ captured, respectively, at approximately 90% capture efficiency in units of work when including lost capacity and impact on other plant processes, based on DOE simulations of these processes using the same software and very similar assumptions as used here. The equivalent work requirement of the CCC process at 90% capture efficiency is 0.53 GJ/ton in an embodiment simulated using commercial software. Under best-of-class conditions (92% efficient compressor, 5° C. average temperature difference in heat exchanger, 95% efficient turbine, etc.), the CCC process achieves 90% capture efficiency with nominally pure $CO_2$ as product at a specific energy cost of 0.49 GJ/ton $CO_2$ and with $SO_x$ and $NO_x$ effluent concentrations less than 1 ppm each (representing >99% capture of these pollutants), approaching ¼ of the energy requirement of the alternatives. As mentioned previously and explained above, heat exchanger design details increase this number, but it remains well below 50% of the energy requirements of the alternative processes.

Detailed modeling suggests the energy balance numbers above are only slightly optimistic, except at the very high capture efficiencies. Based on an external refrigeration cycle (least efficient of the alternatives) with detailed thermodynamics and heat transfer models, we estimate an overall energy demand of 0.8 GJ/ton $CO_2$ captured in this process at 90%+ capture.

Example 3

Example 3 shows simulated energy demand data for various embodiments of the invention applied to CCC under different assumptions and parameters, the systems having similar configuration as those in Example 1 and 2.

Extremely high capture efficiencies require far more energy than theoretical analyses suggest. Indeed, while the theoretical energy costs of perfect separation (100% capture and 100% pure) are finite; there is no continuous industrial process that can achieve this limit with finite energy. The CCC process, however, does not incur rapidly increasing energy costs until close to this limit, as shown in FIG. 10. The entire $CO_2$ flow can only be captured by this technique by going to absolute zero, where vapor pressures are zero but which requires infinite energy. However, temperatures of −130° C. represents greater than 99% capture of an initial 14% flow. The results from these more detailed analyses appear below.

Table 2 is a compilation of the various process components energy demand relating to the overall energy performance. The first six rows are in units of GJ/ton $CO_2$. The eighth row is in units of GJ/ton of $CO_2$ captured, that is, it is 90% of the sum of the first six rows for a 90% capture analysis. These numbers do not change as the overall power plant thermal efficiency changes. The last five rows assume the CCC process operates on process gas from pc-fired USC and SC units with firing rates of 7654 Btu/kWh and net plant thermal efficiency on a HHV basis of 44.6% for the USC comparisons and 8662 Btu/kWh and 39.4 net plant efficiency for the SC unit. These units produce power at a rate of 5.17 and 4.57 $GJ_e$/ton $CO_2$ produced, respectively. As shown, the numbers in the last three rows change with changing power cycle performance, increasing with increasing firing rate or decreasing thermal efficiency. The last row, labeled DOE energy penalty, is computed in a manner similar to that of DOE's reports, in which the absolute percent change in the generation efficiency of a plant is included assuming that it both shifts to USC generation cycles and that it incorporates carbon capture.

A sensitivity analysis indicates these energy results depend most strongly on assumed compressor efficiency. As shown in Table 2, compression losses are the largest of the non-inherent energy demands. The first three rows are inherent in any separation system and their sum represents the thermodynamically limited performance. The compression losses are generally 2-3 times as large as the losses associated with maintaining realistic temperature differences in the heat exchangers, the latter being labeled as sensible heat losses. This simple analysis does not show the effects of varying and sometimes large temperature differences in the complex heat exchangers, heat leaks, etc. These are included in the analysis of the last column.

TABLE 2

|  | 100% Capt; Min. E | 90% Capt; Min. E | 100% Capt; 5° K ΔT | 90% Capt; 5° K ΔT | 100% Capt; 10° K ΔT | 90% Capt; 10° K ΔT | 90% Capt; Full Simul |
|---|---|---|---|---|---|---|---|
| Separation | 0.163 | 0.149 | 0.163 | 0.149 | 0.163 | 0.149 | 0.149 |
| Condensation | 0.223 | 0.201 | 0.223 | 0.201 | 0.223 | 0.201 | 0.223 |
| Liquid Compression | 0.010 | 0.009 | 0.010 | 0.009 | 0.009 | 0.009 | 0.010 |
| Sensible Heat Loss |  |  | 0.098 | 0.098 | 0.195 | 0.195 | 0.418 |
| Total Specific E. (GJ/ton) | 0.396 | 0.359 | 0.493 | 0.456 | 0.590 | 0.554 | 0.800 |
| Compression Losses | 0.150 | 0.136 | 0.186 | 0.172 | 0.223 | 0.209 | 00.353* |
| Fraction of $CO_2$ Captured | 1 | 0.9 | 1 | 0.9 | 1 | 0.9 | 0.9 |
| Total E./ton $CO_2$ Captured | 0.546 | 0.445 | 0.680 | 0.566 | 0.763 | 0.732 | 0.720 |
| % Red. in USC Output | 10.55% | 8.60% | 13.15% | 10.94% | 14.76% | 14.15% | 13.93% |
| % Red. in SC Output | 11.94% | 9.74% | 14.89% | 12.38% | 16.70% | 16.02% | 15.76% |
| USC Energy Penalty | 4.71% | 3.84% | 5.87% | 4.88% | 6.58% | 6.31% | 6.21% |
| SC Energy Penalty | 4.71% | 3.84% | 5.86% | 4.88% | 6.58% | 6.31% | 6.21% |
| DOE Energy Penalty | −0.005 | −0.014 | 0.007 | −0.003 | 0.014 | 0.011 | 0.010 |

*includes additional sensible heat losses due to non-constant temperature differences and heat leaks in the heat exchangers.

The first two data columns of Table 2 show the data for systems with zero sensible heat loss, representing the theoretical maximum of energy efficiency of the systems contemplated by the invention, where first column assumes 100% carbon capture efficiency, while the second column assumes 90% capture efficiency. The third and fourth columns show data of 100% and 90% capture efficiency, respectively, for a system that creates a temperature drop of 5° K on a warmer stream at the bottom of a cooling cycle, changing it from being the warmer stream to being the cooler stream. This system uses the separated process streams as the coolant to cool the warmer mixed process stream, with the mixed process stream being compressed first then the separated process streams being expanded to create the temperature drop. The fourth and fifth data columns show data of 100% and 90% capture efficiency, respectively, for a system according to the current invention, which creates a 10° K temperature on an ECL at the bottom of the cooling cycle. The last column represent the same system as the previous ones, taking into account more realistic and complex assumptions, including additional impurities in the mixed process stream, pressure losses in the process, moisture condensation, and heat exchanger design details.

One logical way to view these numbers is to consider the first two columns as the best possible performance, exceeding the absolute minimum energy only by the compression losses, which are conservatively estimate. The following two columns indicate the effects of realistic heat transfer with industry-standard temperature differences. The next two columns show heat transfer with large temperature differences. The final column shows the approximate results of a complete analysis that can almost certainly be further optimized.

As indicated, the most ideal assumptions about the CCC process indicate that the efficiency decrease associated with carbon capture is approximately the same (slightly less than in several cases) the efficiency increases associated with the USC plant.

The overall impact of the CCC process on energy performance ranges from about a 8.6% reduction in power plant output (90% capture, most ideal process, USC plant) to about an 13.1% reduction under the most challenging conditions (100% capture, largest $\Delta T$ in the heat exchangers, SC plant). Also shown are the results from detailed process analyses that include non-linear heat exchanger temperature profiles, heat losses, and an external refrigeration loop and all other details of actual operation. This process is a typical, non-optimized but well-designed implementation of CCC and results in a 14-16% reduction in electrical output.

All of these numbers, including the most pessimistic of them, represent large improvements in the carbon capture system performance relative to that of an amine system. For comparison, DOE estimates 29-30% reductions in SC power plant output using solvent-based or oxyfuel driven systems. Furthermore, with the exception of the heat exchangers, a CCC process can be built with technology that either exists or is a minor perturbation of what currently exists. The most ideal CCC process will require more original design, but a functional process will require relatively little design aside from the heat exchangers.

Example 4

Example 4 provides a comparison with systems analogous to those in Example 3, but with higher compressor efficiency. For comparison, Table 3 includes data computed with 87% effective compressor performance, but otherwise similar assumptions.

TABLE 3

|  | 100% Capt; Min. E | 90% Capt; Min. E | 100% Capt; 5° K $\Delta T$ | 90% Capt; 5° K $\Delta T$ | 100% Capt; 10° K $\Delta T$ | 90% Capt; 10° K $\Delta T$ | 90% Capt; Full Simul |
|---|---|---|---|---|---|---|---|
| Separation | 0.163 | 0.149 | 0.163 | 0.149 | 0.163 | 0.149 | 0.149 |
| Condensation | 0.223 | 0.201 | 0.223 | 0.201 | 0.223 | 0.201 | 0.223 |
| Liquid Compression | 0.010 | 0.009 | 0.010 | 0.009 | 0.009 | 0.009 | 0.010 |
| Sensible Heat Loss |  |  | 0.098 | 0.098 | 0.195 | 0.195 | 0.418 |
| Total Specific E. (GJ/ton) | 0.396 | 0.359 | 0.493 | 0.456 | 0.590 | 0.554 | 0.800 |
| Compression Losses | 0.087 | 0.079 | 0.108 | 0.100 | 0.130 | 0.122 | 0.353* |
| Fraction of $CO_2$ Captured | 1 | 0.9 | 1 | 0.9 | 1 | 0.9 | 0.9 |
| Total E./ton $CO_2$ Captured | 0.483 | 0.394 | 0.602 | 0.501 | 0.675 | 0.647 | 0.720 |
| % Red. in USC Output | 9.34% | 7.61% | 11.64% | 9.68% | 13.06% | 12.53% | 13.93% |
| % Red. in SC Output | 10.57% | 8.62% | 13.17% | 10.96% | 14.78% | 14.18% | 15.76% |
| USC Energy Penalty | 4.17% | 3.40% | 5.19% | 4.32% | 5.83% | 5.59% | 6.21% |
| SC Energy Penalty | 4.17% | 3.40% | 5.19% | 4.32% | 5.82% | 5.59% | 6.21% |
| DOE Energy Penalty | −0.010 | −0.018 | 0.000 | −0.009 | 0.006 | 0.004 | 0.010 |

*includes additional sensible heat losses due to non-constant temperature differences and heat leaks in the heat exchangers.

The estimates in Table 4 and 5 indicate how these numbers correspond to the fraction of power plant output, using DOE models as indicators of such output. The last row represents the percent decrease in net power output from a plant assuming the ultra-supercritical performance documented by DOE, i.e., net plant heating rate of 7654 Btu/kWh and net plant thermal efficiency on a HHV basis of 44.6%, and the percentage change in the thermal HHV efficiency of such a plant. That is, the CCC process with 90% capture and an average 5° K heat transfer driving force with an 87% efficient compressor will reduce the output by 8.30%, or change the HHV net plant thermal efficiency from 44.6% to 40.9%, a reduction of about 3.7 percentage points. These results consider only an energy analysis. The more complete process modeling (last column) indicates the reduction is closer to 15% in power, or a decrease of 6 percentage points. However, this can still be significantly improved.

Example 5

Figure 11:
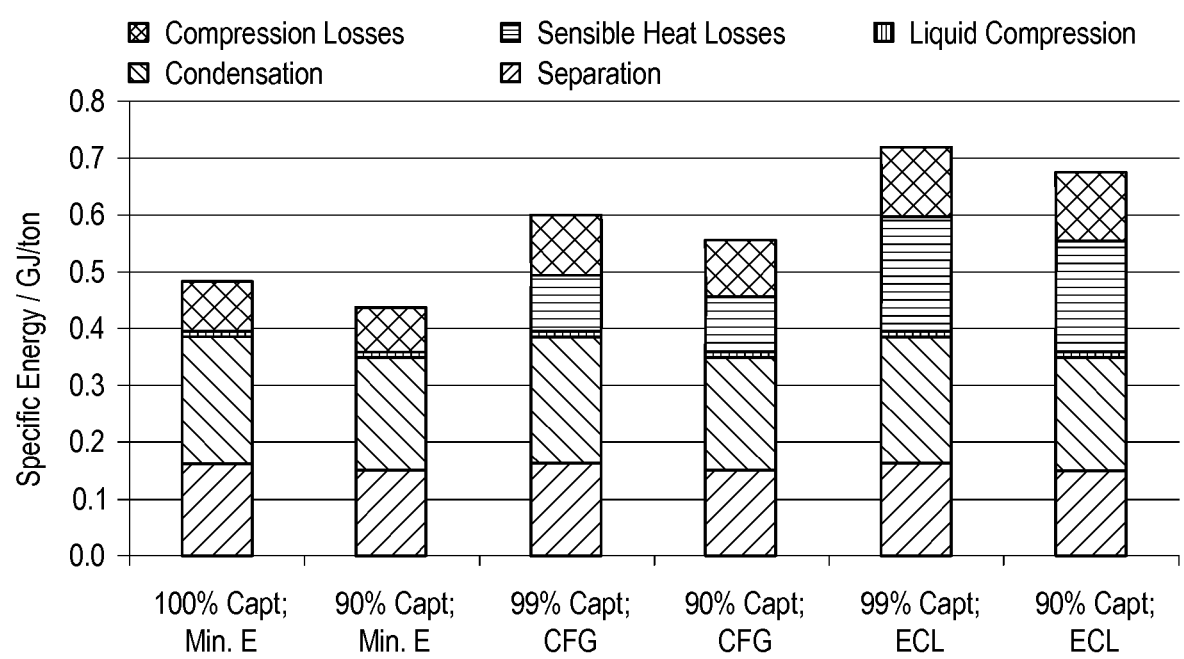
FIG. 11 shows the energy allocations in various model systems implemented according to the invention, assuming 15° C. temperature differences in the heat exchangers and 0.87 isentropic turbine efficiency.

Example 5 provides additional data with systems comparable to those in Example 4, but creating an even larger temperature drop in the warmer-to-cooler stream at the bottom of the cooling cycle. FIG. 11 presents data in bar charts form to facilitate visual comparisons of the energy demands of various systems and system components.

As evident from the figure, even with the assumption of larger than real cooling load, the highest energy demand of the systems at around 0.7 GJ/tonne still compares very favorably to conventional Oxycombustion and amine absorption processes, which require about 1.8 and 2.2 GJ/tonne $CO_2$ captured.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for separating a condensable vapor from light gases or liquids by desublimating the condensable vapor, comprising:

(i) cooling a mixed process stream comprising the condensable vapor and at least one light gas or liquid to a temperature of T1 to cause the condensable vapor to desublimate, using a refrigerant of a cooling loop, the condensable vapor desublimating during heat exchange between the mixed process stream and the refrigerant of the cooling loop;

(ii) separating the desublimated condensable vapor from the light gas or liquid to form a solid stream and a light gas or liquid stream;

(iii) pressurizing the solid stream; and (iv) cooling or transferring heat from the refrigerant of the cooling loop using at least a portion of the solid stream, thereby melting at least a portion of the solid stream to form a liquid stream.

2. The invention of claim 1, wherein step (iv) further comprises condensing at least a portion of the refrigerant at a temperature in a range of 0-20° C. above the melting temperature of the solid stream at a pressure.

3. The invention of claim 1, wherein step (iv) further comprises condensing at least one of the refrigerant at a temperature in a range of 0-5° C. above the melting temperature of the solid stream at a pressure.

4. The invention of claim 1, wherein step (i) further comprises boiling at least a portion of the refrigerant at a temperature in a range of 0-20° C. below the desublimating temperature of the condensable vapor at a pressure.

5. The invention of claim 1, further comprising expanding the refrigerant before using them to cool the mixed process stream and compressing the expanded refrigerant thereafter.

\* \* \* \* \*